(12) United States Patent
Mindrum

(10) Patent No.: US 6,340,978 B1
(45) Date of Patent: *Jan. 22, 2002

(54) METHOD AND APPARATUS FOR RECORDING AND PRESENTING LIFE STORIES

(75) Inventor: Gordon Scott Mindrum, Cincinnati, OH (US)

(73) Assignee: Making Everlasting Memories, Ltd., Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,825

(22) Filed: Jan. 30, 1998

Related U.S. Application Data

(60) Provisional application No. 60/037,010, filed on Jan. 31, 1997.

(51) Int. Cl.[7] .................................................. G06F 5/00
(52) U.S. Cl. ........................ 345/764; 345/762; 345/733
(58) Field of Search ................................ 345/326, 349, 345/302, 348, 328, 333, 346, 357, 334, 347, 329; 369/19; 40/455; 386/54; 704/275; 707/501, 504, 102, 104, 516

(56) References Cited

U.S. PATENT DOCUMENTS

| | | | | |
|---|---|---|---|---|
| 3,928,928 A | | 12/1975 | Kalust ........................ 40/455 |
| 4,169,970 A | | 10/1979 | Opiela et al. ................. 369/19 |
| 4,304,076 A | | 12/1981 | Splendora .................... 52/104 |
| 5,249,294 A | * | 9/1993 | Griffin, III et al. ......... 713/200 |
| 5,278,662 A | * | 1/1994 | Womach et al. ............ 358/335 |
| 5,307,456 A | * | 4/1994 | MacKay ..................... 345/328 |
| 5,404,343 A | | 4/1995 | Boggio ........................ 369/19 |
| 5,526,854 A | * | 6/1996 | Gibson ....................... 345/302 |
| 5,569,880 A | | 10/1996 | Galvagni et al. .......... 174/52.4 |
| 5,604,855 A | * | 2/1997 | Crawford .................... 345/473 |
| 5,615,937 A | | 4/1997 | Bellanger .................... 353/97 |
| 5,629,980 A | * | 5/1997 | Stefik et al. .................. 705/54 |
| 5,680,639 A | * | 10/1997 | Milne et al. ................. 345/302 |
| 5,717,869 A | * | 2/1998 | Moran et al. ............... 345/339 |
| 5,729,741 A | * | 3/1998 | Liaguno et al. ............ 707/104 |
| 5,729,921 A | | 3/1998 | Rojas ........................ 40/124.5 |
| 5,732,231 A | * | 3/1998 | Evans, III .................... 345/339 |
| 5,732,515 A | | 3/1998 | Rodrigues et al. ............. 52/103 |
| 5,760,767 A | * | 6/1998 | Shore et al. ................. 345/328 |
| 5,761,684 A | * | 6/1998 | Gibson ........................ 707/515 |
| 5,798,759 A | * | 8/1998 | Dahl ........................... 345/339 |
| 5,799,318 A | * | 8/1998 | Cardinal et al. ............ 707/104 |
| 5,828,904 A | * | 10/1998 | Batson et al. ................. 710/58 |
| 5,832,283 A | * | 11/1998 | Chou et al. .................. 713/300 |
| 5,903,664 A | * | 5/1999 | Hartley et al. .............. 382/154 |
| 6,065,002 A | * | 5/2000 | Knotts et al. .................. 707/4 |

OTHER PUBLICATIONS

Leif Technologies Inc., World Wide Web page; View•logy™, Memorials That Tell A Story, Copyright 1997.
Funeral Monitor, Jan. 20, 1997, vol. 6, No. 3.
The Grateful Dead Can Tell Their Story: Just Click a Mouse, Elizabeth Seay, Wall Street Journal Mar. 16, 1998.

* cited by examiner

Primary Examiner—Raymond J. Bayerl
Assistant Examiner—Tadesse Hailu
(74) Attorney, Agent, or Firm—Dinsmore & Shohl LLP

(57) ABSTRACT

The user interface on a computer system displays information about an entity, such as a person, a business, a pet, a country, etc. The screen is associated with the entity. A plurality of recordations are associated with the entity. The recordations are of at least two different types and are associated with the period of time. A plurality of selection mechanisms are on the screen. Each of the selection mechanisms are associated with at least one type of recordation. A time selection mechanism is adapted for selecting a period of time. The time selection mechanism is associated with at least a portion of the plurality of recordations and is operative to present one or more recordations which correspond with the selected period of time. The user interface can be accessed over a computer, either as a stand-alone or over a network, whereas on a memorial such as in a headstone.

18 Claims, 20 Drawing Sheets

METHOD AND APPARATUS FOR RECORDING AND PRESENTING LIFE STORIES

RELATED APPLICATIONS

This application claims the benefit of U.S. Provisional Application No. 60/037,010, filed Jan. 31, 1997.

COPYRIGHT PRESERVED

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to recording and displaying information about entities, and will be specifically disclosed as a method and apparatus for recording and presenting the life story of an individual.

BACKGROUND OF THE INVENTION

Throughout history and across cultural divisions, a variety of different ceremonies and memorials have been used to commemorate the death of a loved one. Indeed, ceremonies and memorials have become integral for helping the living cope with the death and for commemorating the loved one for future generations. For instance, traditional western ceremonies typically involve a funeral home visitation, a burial, and a wake, with the grave site being marked by a headstone. In the case of cremation, ashes are often placed in a sealed urn. For many historically significant individuals, their deaths are sometimes commemorated with a memorial, such as a statue, which is often dedicated years after that individual's death.

While traditional ceremonies and memorializations are without a doubt important, they do have several shortcomings. For instance, visitors have traditionally been required to be physically located at the ceremony or the memorial to view or reflect on the individual. If you are not physically present at the ceremony or the memorial, you cannot share in the achievements and memories associated with the individual. In the case of many ceremonies, the duration is limited to the actual time of the ceremony. Any reflection after the ceremony is limited to the memories of those who actually attended. A further shortcoming is the relatively limited scope of the commemoration. Visitations typically involves a eulogy and memories shared between the participants. Outside the spoken words of the visitors, however, little or no other memories are shared. In the case of traditional memorials, including headstones, urns, statues and the like, memories and messages are usually limited only to a few words etched in stone or on a plaque.

Beyond the death industry, many things such as businesses, buildings, pets, and the like are also commemorated. In addition, the memories and achievements of living individuals are often compiled, either by others or by the person themselves, usually in the form of a scrap book or biography. However, such commemorations are typically fraught with the same shortcomings listed above. Therefore, there is a need for a method and apparatus recording life stories which solves one or more the problems found in the prior art.

SUMMARY OF THE INVENTION

Accordingly, an object of the invention is to provide an method and apparatus for recording information about an entity.

Another object of the invention is to provide a method and apparatus for presenting information about an entity.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a user interface on a computer system for displaying information about an entity, such as a person, a business, a pet, a country, etc. A screen is associated with the entity. A plurality of recordations are associated with the entity. The recordations are of at least two different types and are associated with a period of time. A plurality of selection mechanisms are on the screen. Each of the selection mechanisms are associated with at least one type of recordation. A time selection mechanism is adopted for selecting a period of time. The time selection mechanism is associated with at least a portion of the plurality of recordations and is operative to present one or more recordations which correspond with selected period of time. The user interface can be accessed over a computer, either as stand-alone or over a network, or as in a memorial such as in a headstone.

Another aspect of the invention is a method in a computer system for presenting information about a person. A plurality of recordations relating to the person are collected. The recordations are categorized into different types. Recordations are also referenced with a period of time. A plurality of options are displayed. One or more of the options correspond to at least one type of recordation and at least one of the options corresponds to a period of time. A user selects one or more of the options and the recordations are presented in accordance with the selected option by a user.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Figure 1:
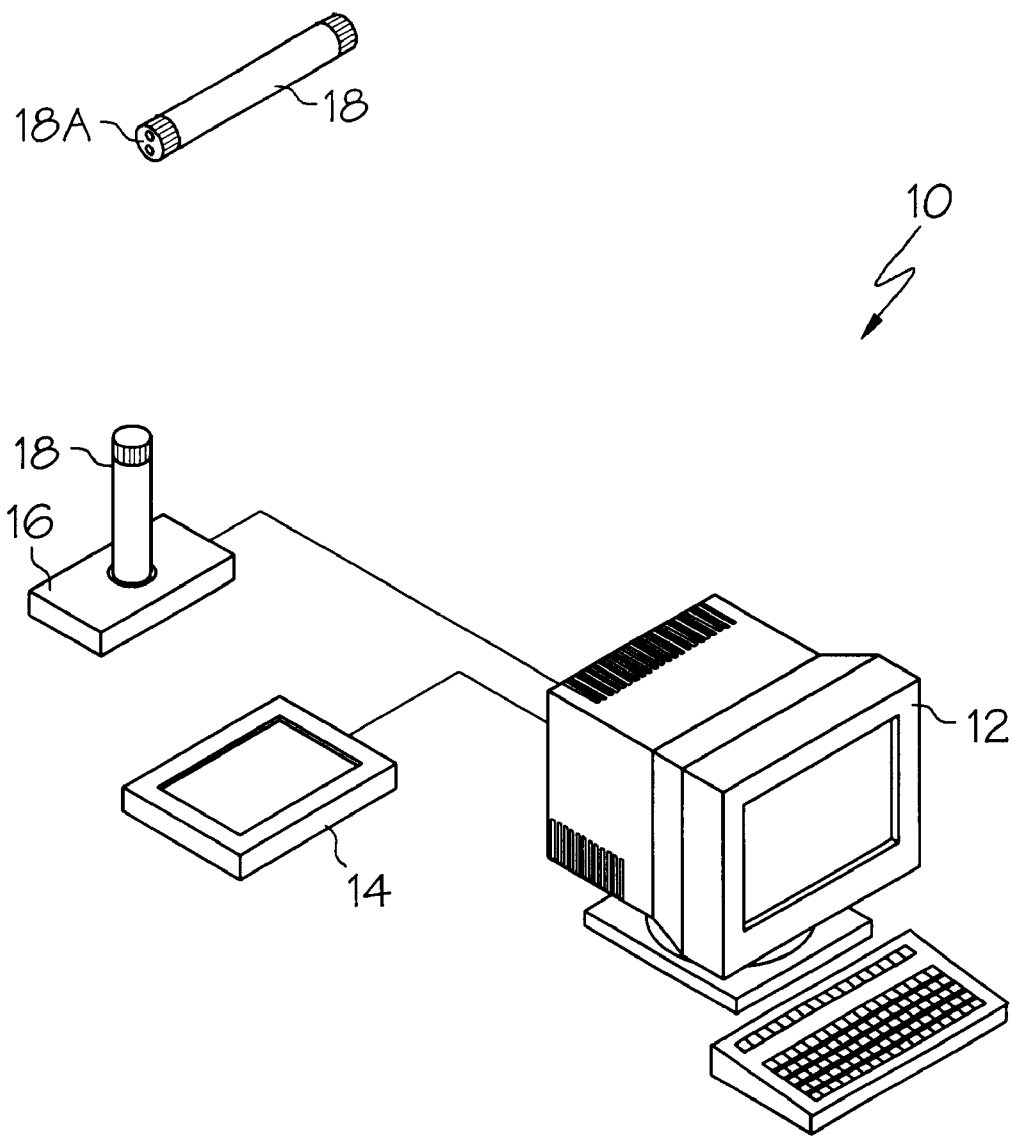
FIG. 1 shows a computer system for storing information about an entity.

One aspect of the invention is the "Family Life Story." Family Life Story provides for the organization, permanent storage and easy retrieval of individual and family records and memories. Using software and computer related hardware, one may produce (for themselves or others) a detailed, chronological history and background of a life—complete with pictures, important documents, completed personal information questionnaires, audio and video clips, and other information.

All information will be collected, preferably using easy to follow instruction materials—("Life Pack"), which will be scanned and/or input to a data base management system and, after quality control procedures are performed, stored in permanent archives. Upon completion of the input service, all original information will be returned to the person, who will also receive a multimedia CD-ROM version or some other multimedia device of their completed Family Life Story (including operating software and general world historical data), along with information on how to access the finished Life Story from the permanent archives. Access will be limited, according to person's wishes, in the following exemplary ways:

1) Release to anyone "legitimately" requesting information;

2) Release to immediate (and identified) family members or ancestors

3) Release to clergy or church officials

4) Release to funeral home or cemetery officials

Ideally, when Family Life Story is produced before death, the Funeral Director will be supplied with a multimedia version to display during the funeral service. Participating funeral homes will be able to present a fully automated, tasteful, chronological Life Story for their customers, with only a modest investment in a hardware configuration.

Family Life Story products could also be available for review at participating Cemeteries by family and friends wishing to visit more than a traditional gravesite. As with funeral homes, participating cemeteries will be able to present fully automated (or completely manual), tasteful, chronological Life Stories about their interred customers with only a modest investment in hardware configuration. With such a system installed at the cemetery, family and friends may access produced Family Life Stories for review while at the cemetery. This system would provide a competitive advantage to those participating cemeteries, and would also allow them to provide additional Life Stories to the families of other interred customers. Called "reloading" in the industry, the ability to provide additional, value-added services to living families of cemetery customers will be an additional benefit of adopting the present invention to active cemeteries.

In addition, one could provide on-line access (for instance via the Internet, direct connection, etc.) for those who wish their Family Life Story to be accessible from anywhere at any time. This optional program will allow family and friends to visit the memory of a loved one at any time from anywhere in the world. This will be an extremely attractive feature to those families that are comfortable with the technology. This aspect of their invention invokes a "virtual cemetery" concept for the permanent storage and viewing of all or even just basic information (e.g., tombstone information).

A variation of the Family Life Story concept is the Family Archive Service. This variation provides a vehicle to store (and retrieve) family data—such as film, video, audio or any information a person would want to confidentially store and simultaneously prevent from degradation. Preferably this variation will be limited to a simple storage of information and, when requested, retrieval of information in a variety of available formats (i.e., video/audio tape, hard copy, etc.).

Still another variation is "Growing Memories", which will use the same basic technology as the Family Life Story, but could be used at schools to parents of students. The concept would be for the annual production and accumulation of life information about students for parents and other family members. The productions, on CD-ROM or other electronic media, would include school pictures (individual, group and miscellaneous), family photos from home, school projects and artwork, messages (written or audio) from classmates and teachers and general historical and personal data. This information would be compiled and produced annually, and accumulated on computer systems each year as a student grows. This variation has the benefit of cross selling opportunity to the students families along with the ability to link Life Stories from different family members.

The systems and methods of the present invention are part of a unique system of permanent and non-degradable storage (and retrieval) of family memories. The capability for permanent storage is a particularly unique feature to be employed in the present invention, since it allows for the timeless preservation of family information without concerns of technology changes (which are inevitable), natural disasters (which are unpredictable), degradation of existing media and memories (which is natural), or moving/shifting families (which has become more prevalent).

These combined capabilities provide users peace of mind that documentation of important family information will be accurately compiled, safely stored and organized for future generations. This, in turn, can be used for providing future family members facts about health, wealth, genealogical, or other information which may be critical (or entertaining) to know or understand about the past.

FIG. 1 illustrates a computer system 10 for recording information about the individual. The computer 12 is connected to peripheral input devices 14, such as a scanner.

Using the peripheral devices 14, various information about the individual are loaded into the computer 12. The information can include a variety of different types of recordations, including, for instance, documents, photos, recordings, videos, textual information and the like. Once the information about the individual is compiled on the computer 12, the information is written to a special memory tube 18 through the read/write interface 16. Preferably the memory tube is made from a rugged material, such as plastic or stainless steel, and is sealed from the outside environment. Information within the tube 18 can be accessed through the electrical interfaces 18A. The memory tube can take any form or size, such as the cylindrical shape shown in FIG. 1, which is preferably about five inches in length and about 1¼ to 1½ inches in diameter. Inside the tube are a series of microchips in which the electronic information about the individual is stored.

One with ordinary skill in the art will readily appreciate that the information about the individual can be stored on any computer readable medium, and is not limited to the embodiment of the memory tube 18. Computer readable medium can take a variety of forms including magnetic storage (such as hard disk drives, floppy diskettes, tapes, etc.), optical storage (such as laser disks, compact disks, etc.), electronic storage (such as random access memory "RAM," read-only memory "ROM," programmable read-only memory "PROM," etc.), and the like. Preferably, the computer readable medium is non-volatile, which will retain data in the absence of power so that the information will be available when power is eventually restored.

Figure 2:
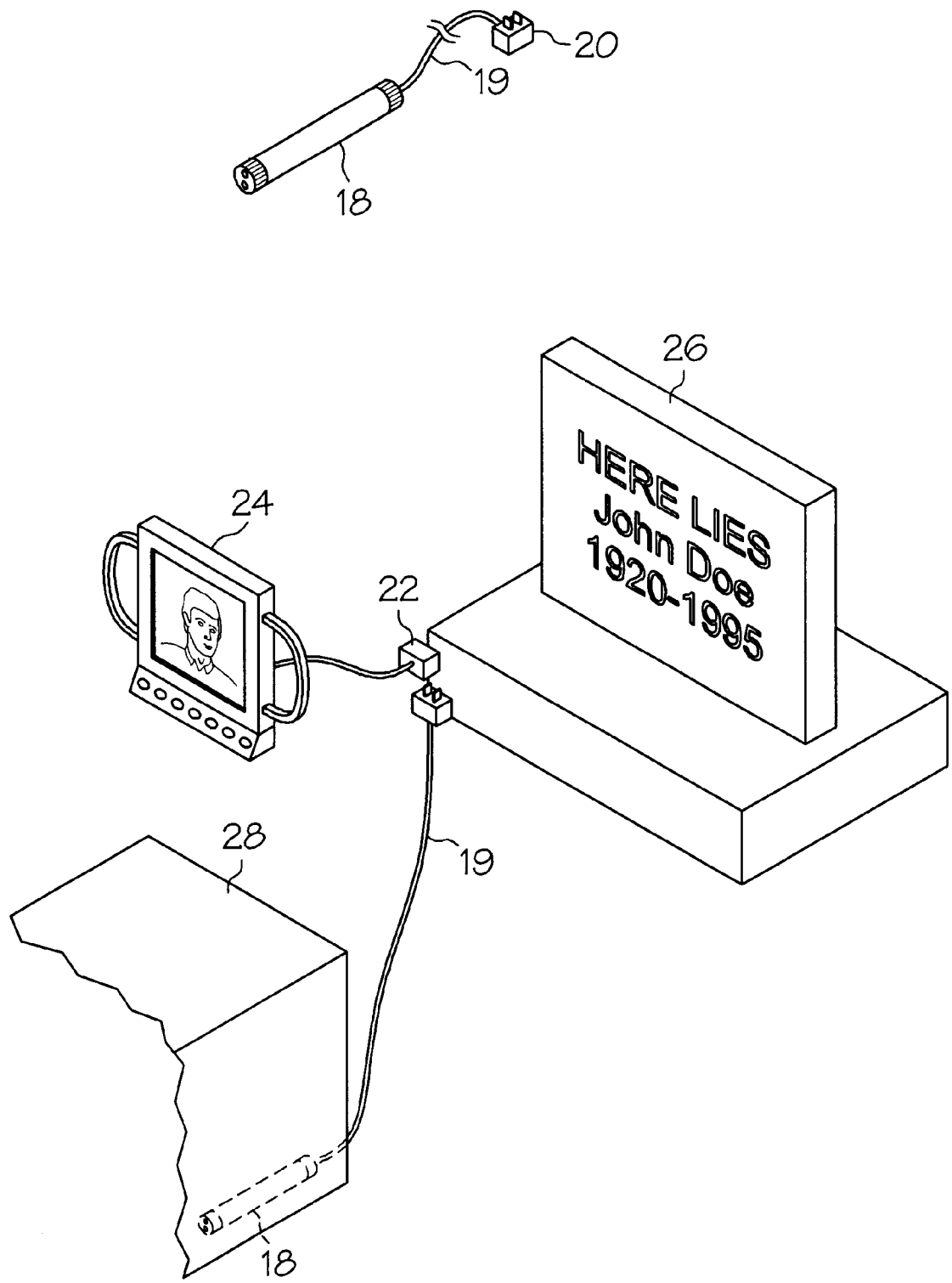
FIG. 2 illustrates a system for retrieving information about an entity.

FIG. 2 illustrates the memory tube 18 in use at a gravesite. The memory tube 18, with the information about the deceased individual stored therein, is physically located within the coffin 28. A communications line 19 links the memory tube 18 with an interface 20 accessible above the surface of the ground. As shown here, the interface 20 is physically connected with the headstone 26. Information in the memory tube 18 is readily accessed and viewed by visitors at the gravesite using the hand-held mobile unit 24 having audio/visual presentation capabilities. The mobile unit 24 includes a connection 22 which can be connected to the interface 20. Once that connection is established, data can be readily retrieved from the memory tube 18.

Figure 3:
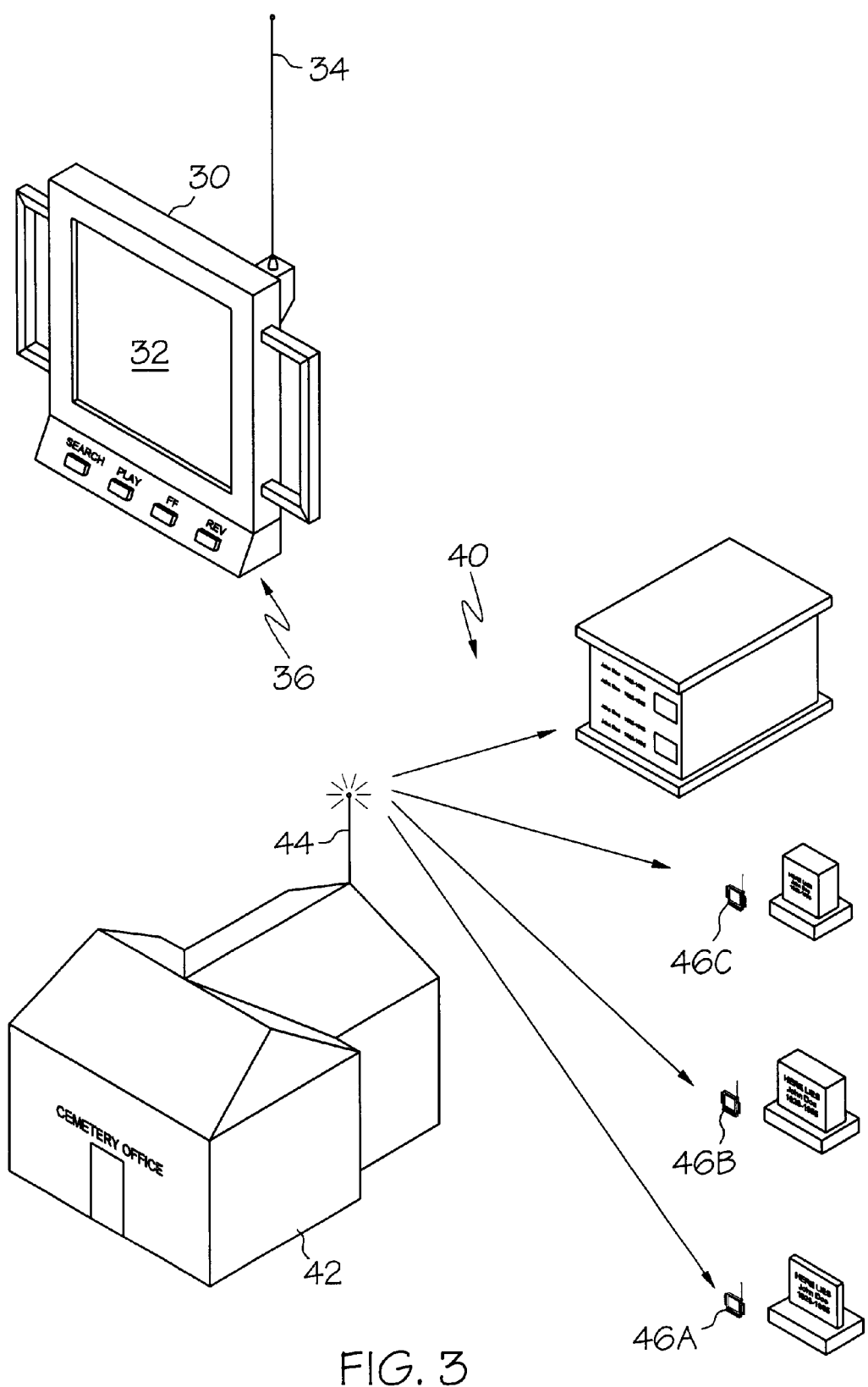
FIG. 3 illustrates an alternative system for retrieving information about an entity.

FIG. 3 depicts an alternative system where the information about the individual is stored in a central location 42, such as a cemetery office. Information is accessed using the mobile unit 30, which sends and receives information over a wireless communication link, such as the radio transmitters 44, 34. The mobile unit 30 includes a viewing screen 32 and a user friendly interface 36 from which the information about the individual can be viewed. Identifiers located adjacent each burial site 46A–46C allow a visitor to access information associated with the individual buried at a particular site. For instance, electronic identifiers 46A–46C each have a unique transponder signal, which when the mobile unit 30 is proximally located will automatically transmit the information to the mobile units 30, which will in turn receive information associated with the individual buried at that particular gravesite.

Figure 4:
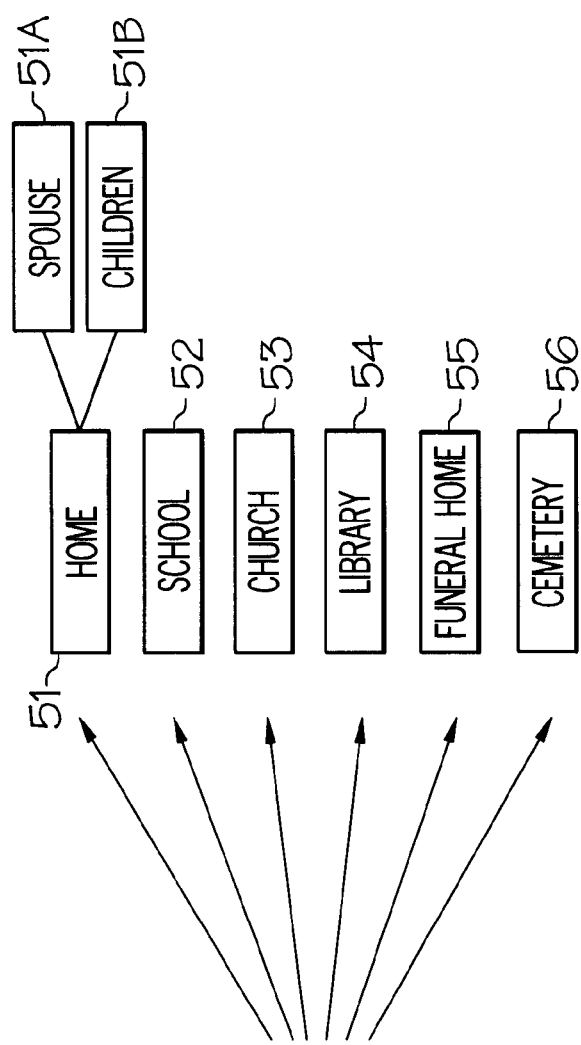
FIG. 4 illustrates still another system for retrieving information about an entity.

FIG. 4 depicts still an alternative embodiment of the present invention in which the information is stored in a central database 50. Information about the individual can be accessible through any kind of remote computer link, such as over the Internet, and can be accessed and used from virtually any place and at any time. Preferably, the information would be secured with two levels, including confidential information accessible for family use only, and public information accessible to anyone. Information in the database 50 would be accessible through the home 51, school 52, church 53, library 54, funeral home 55, cemetery 56, and the like.

Figure 5:
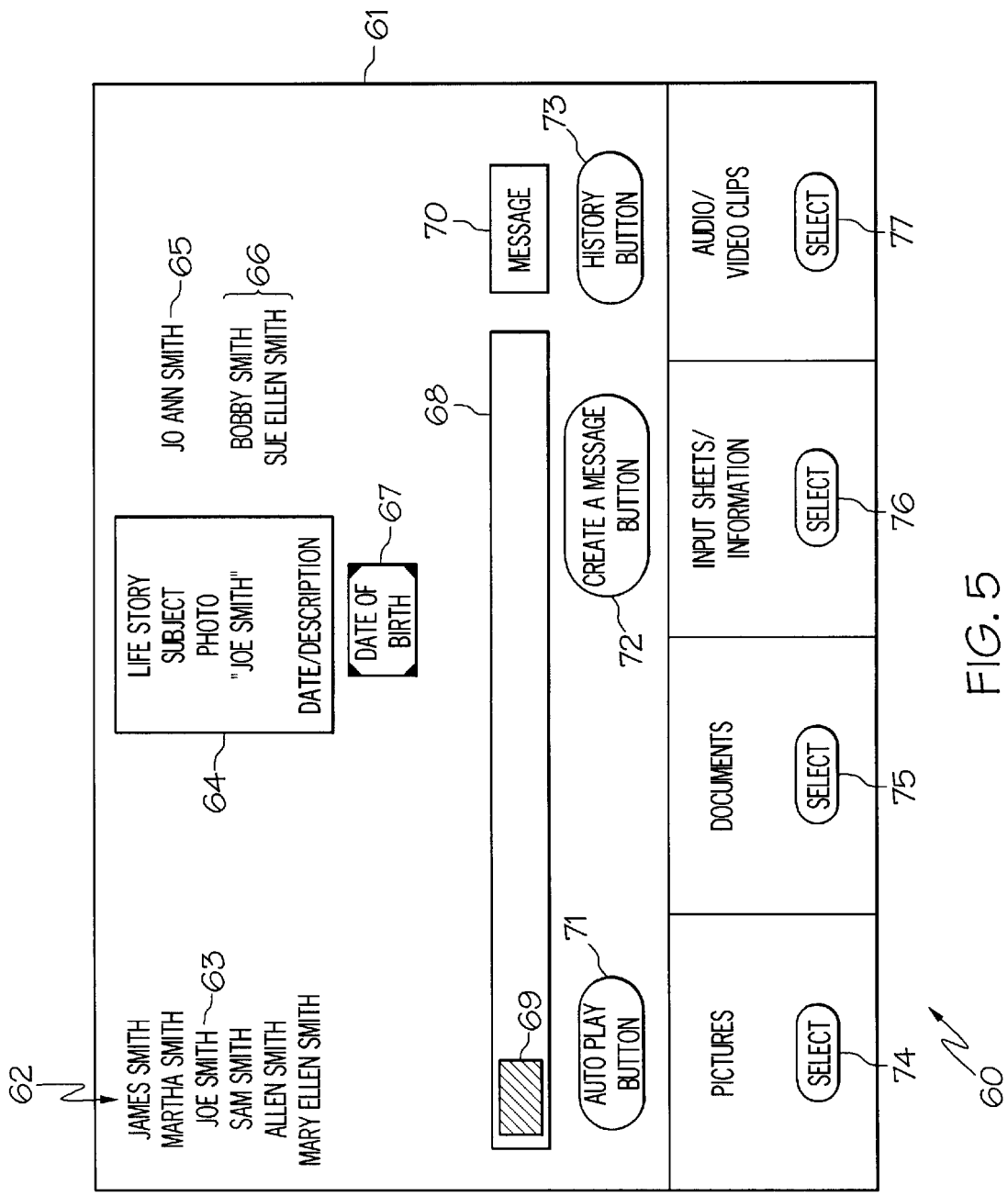
FIG. 5 illustrates a user interface on a screen.
Figure 6:
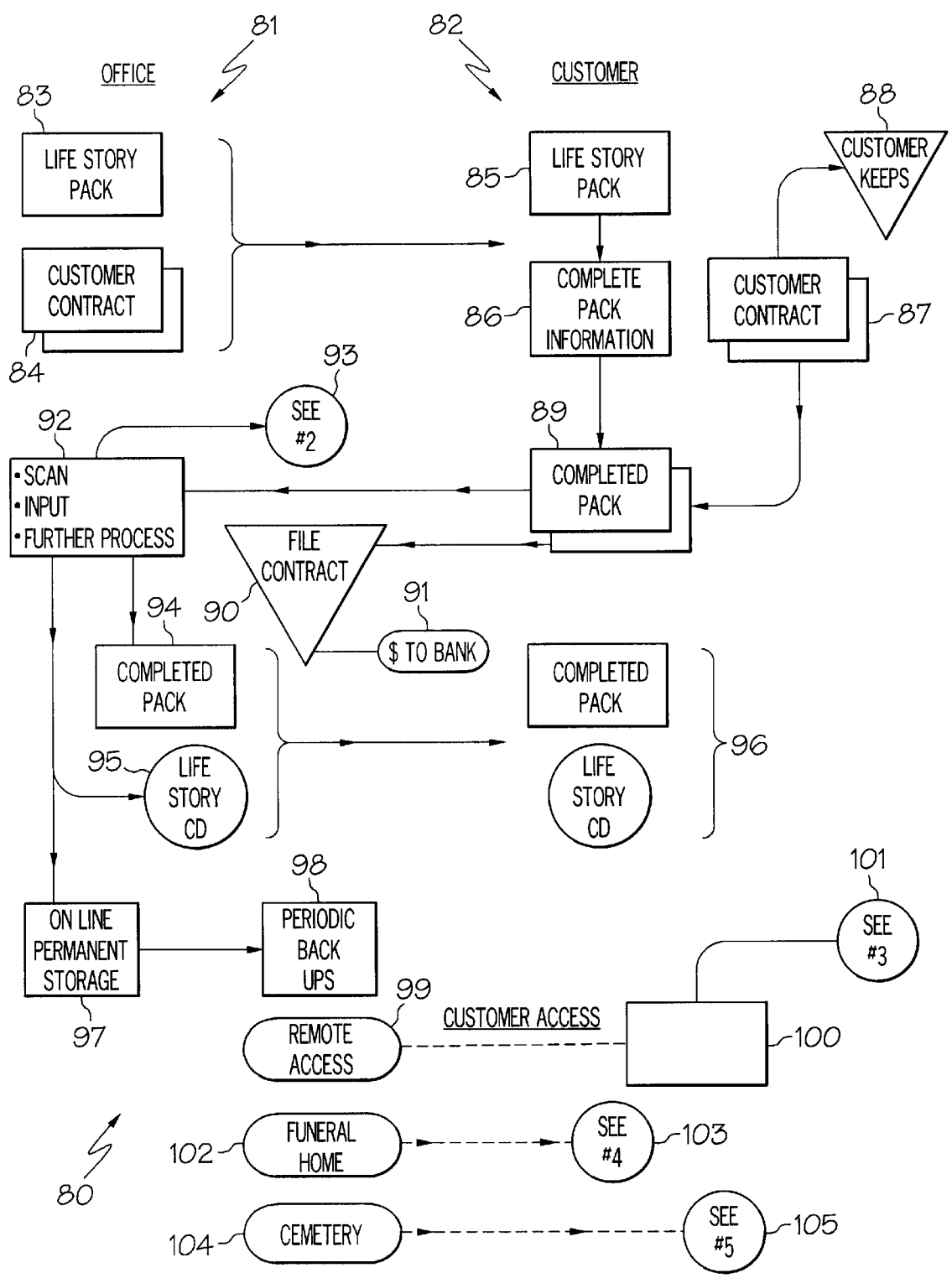
FIG. 6 illustrates a flowchart for recording and accessing information about an entity.

FIG. 5 illustrates a graphical user interface 60 for accessing information about the individual, which can be displayed in a multitude of situations, such as during a funeral, at the cemetery, on-line as a tribute, obituary, or biography, etc. The screen 61 has a variety of selection options for the user to view and access the data. Selection options can take a variety of forms including buttons, mouse selections, keyboard selections, menu items, touch screens, voice commands, and the like. The screen 61 includes a list of relatives 62 associated with the individual. Preferably, the list 62 is arranged in a hierarchial display to graphically show the relationship of each relative in the list 62. Each individual on the list 62 will have a link to a screen associated with that relative. Preferably, relatives on the list 62 will be color-coded to indicate whether a screen exists for that relative, and whether that relative's screen has been visited yet in a particular use session. Preferably, direct relatives, such as the wife 65 and children 66, are showed separate from the other relatives 62.

The screen 61 also has a graphical representation 64 of the individual, which optionally includes the typed name of the individual as well as some other basic information. A preferred graphical representation is a digitized photograph of the individual. When the screen 61 first appears, the date object 67 displays the individual's date of birth. The graphical life line bar 68 includes a slider 69, which defaults to the far left position relative to the bar 68. The bar 68 and slider 69 provide a graphical representation of the timeline of the individual, with the far left position being the date of birth and the far right position being the date of death. If this embodiment is used with living individuals, the far right position would be the present date. As the slider 69 is moved relative to the bar 68, the corresponding dates will appear in the date object 67. Each of the recordations associated with the individual are indexed or referenced by its corresponding date. Upon the selection of a date using the slider 69 and bar 68, those recordations associated with the selected period of time will be presented for the user. The presentation can be either on a separate page, or within the screen 61, such as in the graphical representation window 64. The auto play button 71 will automatically display all recordations in chronological order.

The screen 61 also includes a message button 70, in which messages from the individual can be displayed. The messages can contain, for instance, religious beliefs, values, hopes and knowledge for the public, children and future generations. Optionally, the messages will be time released whereby the messages can only be viewed after a predetermined time period or event has expired. For instance, the individual could leave a message for his son once he turns 18 years old. Alternatively, the message could be triggered upon an event such as when a daughter marries. The selection option 72 allows the user to record a message documenting the user's visit to the screen 61. An ongoing list of messages is stored and searchable, thus providing a virtual visitation book. The selection option 73 provides historical information unrelated to the individual for a selected time period on the timeline bar 68. For instance, user could compare recordations associated with a selected date against historical events at that date.

Recordations can also be viewed by type. By selecting the respective selection mechanism 74, 75, 76 or 77, a user may view the corresponding types of recordations. For instance, the different types of recordations in this embodiment include pictures, documents, input sheets/information, and audio/video clips. To illustrate, when a user selects the selection mechanism 74, the various scanned pictures relating to the individual are presented to the user. The presentation is preferably on a separate screen, however, the presentation could also be within a portion of screen 61, such as in the window 64. Ideally, each recordation will include a brief description, such as typed, text describing the recordation date and other relevant facts, which will be presented along with the recordation. If multiple recordations exist for a given type, it is preferred that selectable list of recordations will be displayed, or the recordations are displayed in chronological order. Optionally, each selection mechanism 74, 75, 76 and 77 will lead a user through options to copy, view, play, print, etc. the recordations categorized under that type.

One challenge in creating Life Stories exists in the input and management of large amounts of data which will result from entering photographs, data, video, and other types of memories. These materials could arrive in a variety of formats which will be categorized into different types of recordations, such as documents (e.g. birth certificate, general documents, transcripts, medical records, drawings, diplomas, obituary statements, etc.), audio (e.g. tapes, CDS, computer audio files [various formats], etc.), video (e.g. tapes [various formats], film, computer video files [various formats], etc.), photographs (e.g. photos, slides, computer graphics files [various formats], etc.), data (e.g. input sheets, typed information, etc.), and other media types which may become available (e.g. holographic images).

Initial information regarding inquiries and orders are expected to come from several sources, including for instance:

(1) Representatives/Distributors—Provided through the "Pre-Need" segment of the Death Care industry, many of the initial orders will come from this channel. Representatives will advance basic information (via phone or fax), and will be assigned a unique code for use in all future correspondence with or about a specific person.

(2) Phone or Mail Orders—Many inquiries and orders could originate by telephone or mail order. Information would be recorded about the person for whom the Life Story is to be prepared. Caller ID could also be used to gather phone and name information. In some cases, the people may request a starter disk, which would allow them to complete a certain amount of the Life Pack information directly on the floppy disk. Having the person complete a certain amount of data entry has the advantage of reducing production time.

(3) Internet—Since the invention has significant Internet potential, preferably one could provide a system for individuals to request information via the Net. Attempts will be made to collect name, address, and e-mail information using this method. Options will also be given for taking orders and completing Life Pack information directly by the person. Having the person complete a certain amount of data entry would help reduce production time.

When a person makes contact via any of the methods mentioned above, one would ideally create an entry in a primary database with the basic information gathered about the person for whom the Life Story is being created. Once this database record has been created, it would be used throughout the remainder of the inquiry, ordering, production, and follow-up support. In addition, this data can also be used later to remind them to periodically (e.g., annually) update their information. This would be especially important for Life Stories which involve children or younger adults.

The process used to produce a Life Story (LS) begins with the receipt of information (Life Pack). Factors and issues in the production of Life Stories are as follows:

(1) Quality Control—Every effort should be made to manage the production process so that the final product will be of the highest quality. This will be done through close order tracking, minimizing the number of individuals involved in production, supervisory review of employee work throughout the process, and a system design which promotes standardized (easy) input for a custom appearance.

(2) Close Tracking of Orders—sophisticated computer systems could be used to execute up-to-the-minute tracking of orders and production. The goal would be to emulate other firms who are known for their customer service, such as major package delivery firms. For example, information about order status and production progress will be would made available on the Internet for users to track the status of their orders. Tracking of information is important because of the priceless, personal nature of items being handled.

(3) Long-Term Emphasis—One aspect of the present invention is to store Life Story information indefinitely. To achieve this goal, it is preferred to develop production and product delivery methods that have longterm applicability which can be upgraded as system needs change and data standards improve. For example, this means storing data in several formats which acknowledge the difficulties in data delivery methods of today versus those which will be available in the future. To illustrate, it is currently impractical to deliver MPEG video to most home PCs via the Internet, or even with CDs. This is because the Internet bandwidth is not adequate and because most home PC systems are not powerful enough to support handling the large amounts of data necessary for full-screen MPEG video. The one solution is to store data in several formats: MPEG, which would provide broadcast quality video, as well as AVI and/or QuickTime formats with lower resolutions and frames per second that could be played on a wider variety of computers today. Longer term, alternative embodiments will work to perform on-the-fly conversion of video and audio from high quality formats which will be stored in the optimal format available for a particular system. Similarly, if one were to order a replacement CD a number of years after the original was produced, and could produce a new one which would contain the same information as the original, but would incorporate any new formats and appropriate software to take advantage of the update.

FIGS. 6–10 depict flowcharts of how information about an individual is collected, recorded and accessed. The actions on the left 81 are performed by a central office, and the actions on the right 82 are performed by the customer, who may be the individual, family member, friends, or others. The following describes the production process for creating Life Stories and its variations. It describes the basic process from the initial contact with the person to mailing the finished product to the user, as well as the production process itself.

In steps 83 and 84, the customer is sent two copies of a contract as well as a Life Pack—which is a packet for organizing and safely shipping materials. A label on the Life Pack could contain a predetermined number. This number would then be used to track the user's information from beginning to end. Upon receipt of the Life Pack 85, the customer completes the Life Pack information 86. Examples of materials which would be gathered to be put in the Life Pack would include the following:

(1) Packing List—A sheet indicating the number of photographs, videos or other items to be added to the system. This sheet will be compared to what is received when unpacking the shipment.

(2) InfoSheets—Life Story data sheets which provide detailed textual information which will be added to the database. The information will include details of the person's life and descriptions of pictures, videos or other information on the Packing List.

(3) Life Story Requester Information—Information about the person requesting the Life Story. This person may or may not be the target of the requested Life Story.

(4) Type of Life Story—Information about the type of Life Story to be created. As there will be different levels based on the complexity of the Life Story, this will need to be specified by the requestor. For example, an individual may have a large amount of photographs they would like to include in the Story, while another may have video footage which is important to them.

(5) Life Story Style Information—The person requesting the Life Story would be given the opportunity to specify basic styles to be included in the package. These types of styles would set the general tone for the Life Story and would include general color schemes, frame style around photos, types of background music, description of user hardware to determine output format, etc.

In step 87, the customer executes the contract. One copy is kept by the customer 88 and the other is combined with the completed Life Pack 89 and returned to the office. When the executed contract is received 90, it is filed and any payments are deposited 91. The Life Pack is then processed in step 92. Once the information is processed and formulated into a multimedia presentation, the customer pack 94 and Life Story CD 95 are returned to the customer 96. The Life Story is placed in an on-line permanent storage 97, which is periodically backed-up 98.

Figure 7:
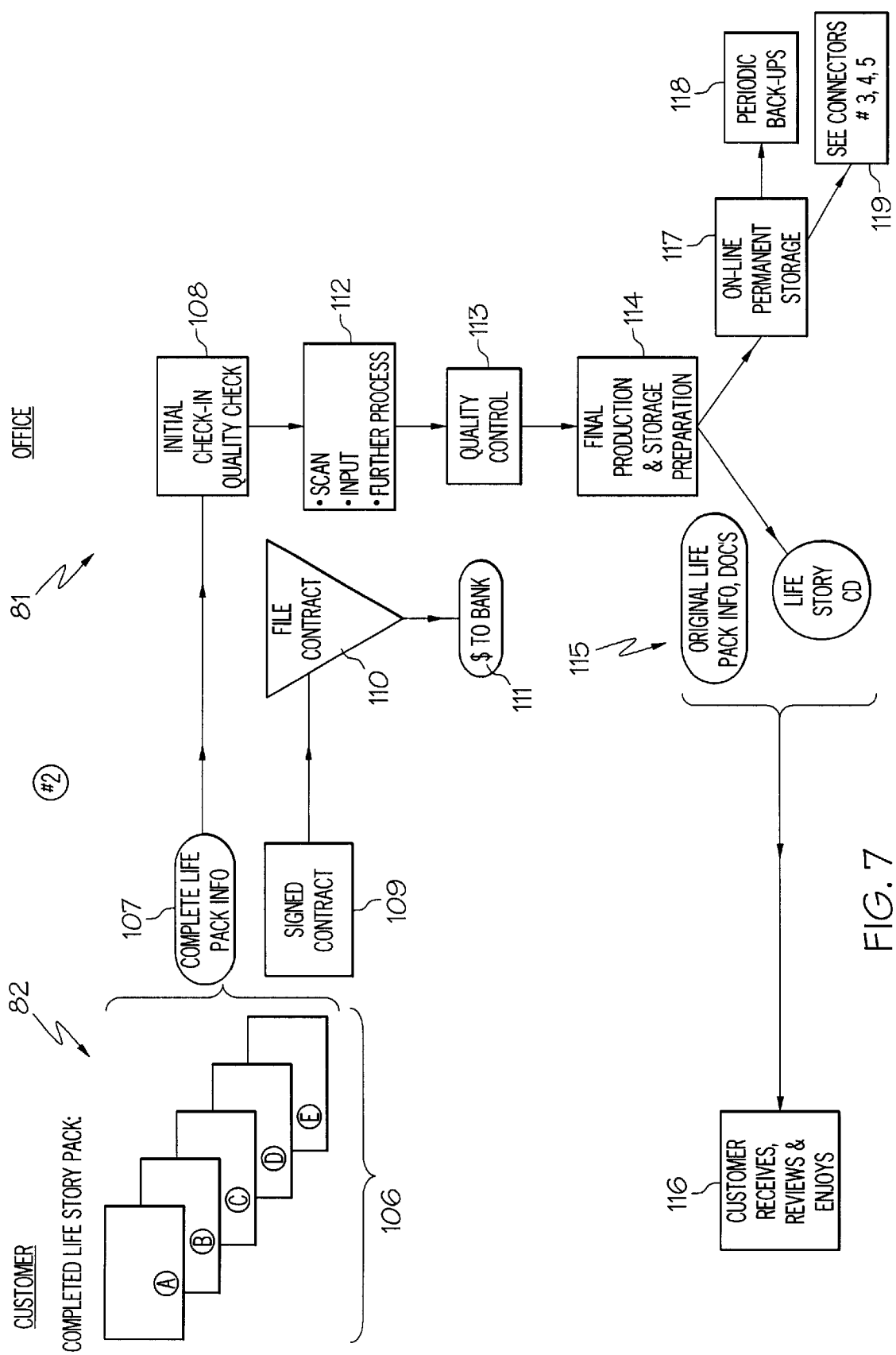
FIG. 7 illustrates a flowchart for collecting and recording information about an entity.

The flowchart in FIG. 7 illustrates a more detailed view of the collecting and processing of the Life Pack 92–98. Actions on the left 82 are performed by the customer and actions on the right 81 are performed by a central office. In step 106, the customer compiles the Life Pack, which can include a variety of different types of recordations, including pictures, documents, data, audio/video, etc. The completed Life Pack 107 and the executed contract 109 are sent to the office. The contract is filed 110 and any payments are deposited 111.

Once the Life Pack has been received 108, it will be opened and recorded with a date and time stamp to indicate that the materials have arrived. This information will be used to track the production process. Preferably, the clerk opening the Life Pack will be responsible for ensuring that the materials arrived in good order and will compare them to the Packing List. Once this information is verified, it can then be used to ensure that all materials are accounted for should there be any questions later. The unique customer number is entered, as well as the type and style of the request and the customer contact.

In step 112, data from the InfoSheets are input into the system. It is expected that most InfoSheet information will arrive in handwritten form, which will need to be typed into the appropriate database fields. In certain cases, the person might enter this information on their own (i.e., through the Internet or floppy disk processes). In this case, there would not be any information to enter and the order would move directly to the production area where the rest of the Life Story would be created.

The production area of the office will be set up with workstation areas outfitted with high-end personal computers with various peripherals necessary for processing the various types of data indicated above. These PC's will be connected to a primary database server via a network. Most workstation PC's will have the peripherals necessary to process data from the most common data types. However, peripherals needed for less common media types can be located in central shared locations so they can be accessed by all production staff. For example, each workstation will include a high quality scanner and video capture cards connected to high end video tape players. The scanners will be used to scan in photographs, documents, certificates, and Info Sheets.

The production worker will begin scanning all of the customers photographs and documents. Templates will be designed to help the worker align multiple pictures, so that several pictures can be scanned at one time. As the scanning is completed, the images will be shown on the workers computer monitor and any simple editing can be done as needed. The person may also tag the photograph with a variety of information provided by the customer, such as the date of the photo, age of the individual, names or any other written description. As a practical matter, most documents to be scanned will include some type of written description. Once files are turned into an electronic format, it will be the responsibility of the production worker to ensure they are properly tagged with the desired information.

Below is a sample of what the database table for storing media-type information is expected to contain:

| Field | Description | Sample Data |
| --- | --- | --- |
| ID | unique id for this record | USA-477-59-5959-01100 |
| Person | unique id for the customer to whose record this electronic file belongs. | US-477-59-5959 |
| File Type | type of data, such as photograph, audio file, or video file. | photo |
| Format | Electronic data format type. | high compression JPEG |
| FCB | Format Created By. This would indicate which software created this type of data in case it was later determined that there were problems with conversion. | |
| Origin Date | Date the original was created, if known. This and the Age field below would be used to put photos or other documents in chronological order in the Life Story. | 6/25/65 |
| Age | If it is a photo, the age of the person could be input if known. This and the above field would be used to put in chronological order in the Life Story. | 5 |
| Notation | Any type of notation on the original article, such as writing on margin or back of photograph. | James 5th birthday. Shown are James, Mary, Tom and Timmy (brothers & sister) |

-continued

| Field | Description | Sample Data |
|---|---|---|
| Defects | Indicate any defect of the original to provide some limit on the office's liability for poor quality of image. | right hand quadrant. |
| Input Date | The date the article was electronically entered into the MEM database. | 01/01/97 |
| Entered By | Who entered the information used for quality control purposes. This will be entered automatically. | 12312 |

Because the invention is concerned with very long-term data storage, it is preferred that information be recorded about the type of data being stored and how it was created. As formats are continually changing, it may be necessary to upgrade the formats or utilize conversion utilities as new formats become available. For example, the video formats that we use today will likely be very inferior to those of the future. One of the most likely improvements is better compression without loss of quality. Since the storage space necessary for the storage of video is a product cost issue, upgrades to better formats could be used when they become available. Another reason for performing a conversion would be to ensure the best compatibility, particularly across the Internet. In this environment, data is sent across the Internet, but then is processed by the user's system. The user must have the proper type of application to utilize the data file. If standards change over time (and they will), the user will not be able to access certain types of files unless standards have been upgraded.

Once images have been scanned and any necessary tagging added, the information will be saved as a record for that person's Life Story in the central database. The above process will be continued for all the various types of recordations to be entered, until all items are entered.

Next, the production worker uses a template to develop a Life Story based upon the chosen format or style, as indicated during the order entry process. This setup information would then be saved in the database record. Once saved, it would be possible to fully replicate the final CD (or other media) created at any time should the additional copies be needed. This would be desirable since it may be necessary to create a new copy utilizing new media and utilizing upgraded data formats if the request is made several years into the future.

Next, a media presentation piece is created to provide to the end user, which would contain the Life Story and other information. This could be in hard copy (print) format, video tape, floppy disk or compact disk (CD). We anticipate that most people will request the CD format and will therefore describe the process in this document. It is expected that the CD would have several pieces of information stored on it:
I. Installation program(s) to set up the Life Story on the user's computer hard disk.
II. The Life Story on the individual including:
  A. runtime media software
  B. data file of all photographs, videos, etc., using the current, reasonable standards available for use on the customers hardware
III. Information about key world and national events which occurred on important dates in the person's life, including birth dates or other important milestones. This data might also include statistical information such as the cost of bread, automobiles and a home during the year a person was born.

During the CD writing process, it is preferred that data flows at a consistent rate so that no drops occur during the writing process. For this reason, a full copy of the entire information to be written to the CD will be created on the local workstation so that the data can then be written to the CD without potential bandwidth bottlenecks of the network.

In one embodiment, step 112 further comprises preparing the information to be available on the Internet (or other distributed or remote access systems). Person's will decide the level of information they wish to have available on the Internet—from none to the complete Life Story. Once this has been determined from the directions, the templates will be chosen and as a result, the amount of work necessary to prepare a Life Story for the Internet will be limited. It is preferred to have matching multimedia and Internet templates to allow for a consistent look and feel, but also take into account the limitations of both distribution formats. At this point in the production process, any special changes requested will be made to make the data properly viewable on the Internet. As part of the quality control process, one could call up the information in an Internet browser to ensure that the information appears correctly.

In step 113, the process goes through a final quality control phase where the customer requests and originals are compared to the imputed product. Preferably, separate quality control steps will be performed after each phase of the input and processing step 112.

The next step 114 involves silk screening the top surface of the CD. This could be performed by the production worker while the system is completing the processing of the Life Story. The top side of the CD will ultimately contain a photo of the individual profiled in the Life Story and also the individual's name, date of processing, and any other appropriate or necessary markings. To accomplish this, a program will be run which will pull the appropriate information from the database and create an on-screen preview, which can be altered as necessary. Once approved, the information would be saved in the database so that additional copies may be created later. Finally, a copy of the label is printed and taken to a separate silk screen workstation, where the CD is taken to have the images printed.

Once the production process 114 is complete, the CD will be packaged in an attractive jewel case or other type of casing which will contain the installation instructions and other pertinent information. The CD and the original materials 115 will be sent back to the requesting person in the same Life Pack packaging via a priority delivery courier service 116. In Step 117, an on-line version of the product is stored in permanent storage, preferably on a non-volatile computer readable medium. Periodically, the on-line storage is backed-up 118 to help ensure the long-term integrity of the information. In step 119, the customers and others access the information.

Figure 8:
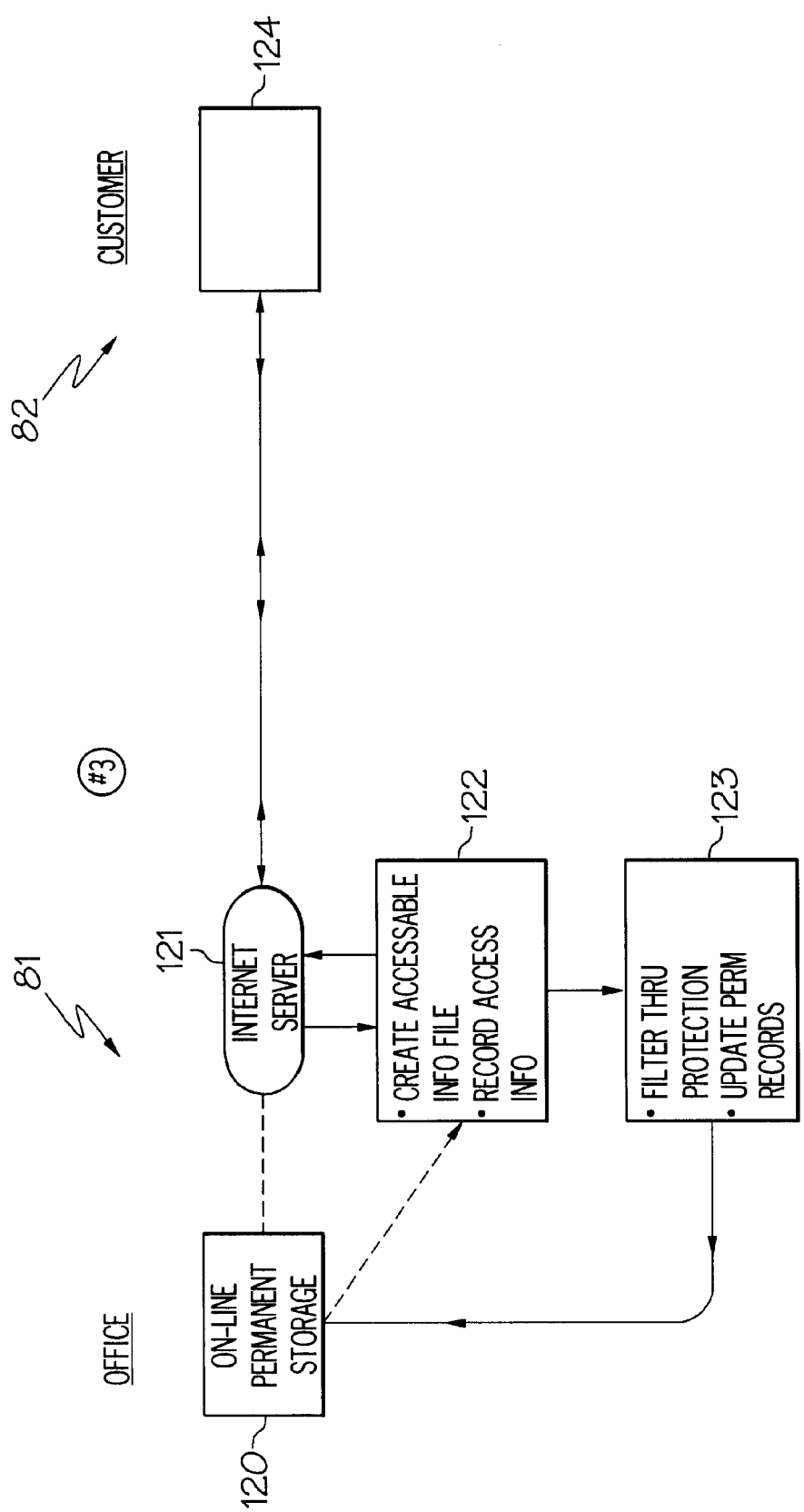
FIG. 8 illustrates a flowchart for remotely accessing information about an entity.

Returning to FIG. 6, customers and others can access the information related to the individual through a variety of ways. One such way is to remote access 99–101. FIG. 8 illustrates a flowchart of such remote access. Actions on the left 81 indicate steps performed by the central office, and actions on the right 82 indicate steps performed by the customer or other person requesting remote access. Remote access can take a variety of forms including through the Internet, direct dial, interactive T.V. and the like. For the purposes of illustration, this aspect of the invention will be illustrated in the form of Internet access. At step 124, the person attempting to access enters the Internet and finds the central office web site. Once in the web site, the person attempting access will typically be required to sign on and enter his or her name and any appropriate passwords. The person attempting access interfaces on the office side 81 through the Internet server 121. In step 122, an accessible information file is transferred from the on-line permanent storage 120. This information file 121 interfaces with the Internet server and provides the information which the user is presented. Whenever somebody logs in, the access information is recorded in step 122. Appropriate filters are maintained and the permanent record is updated in step 123, which is written to the on-line permanent storage 120.

Figure 9:
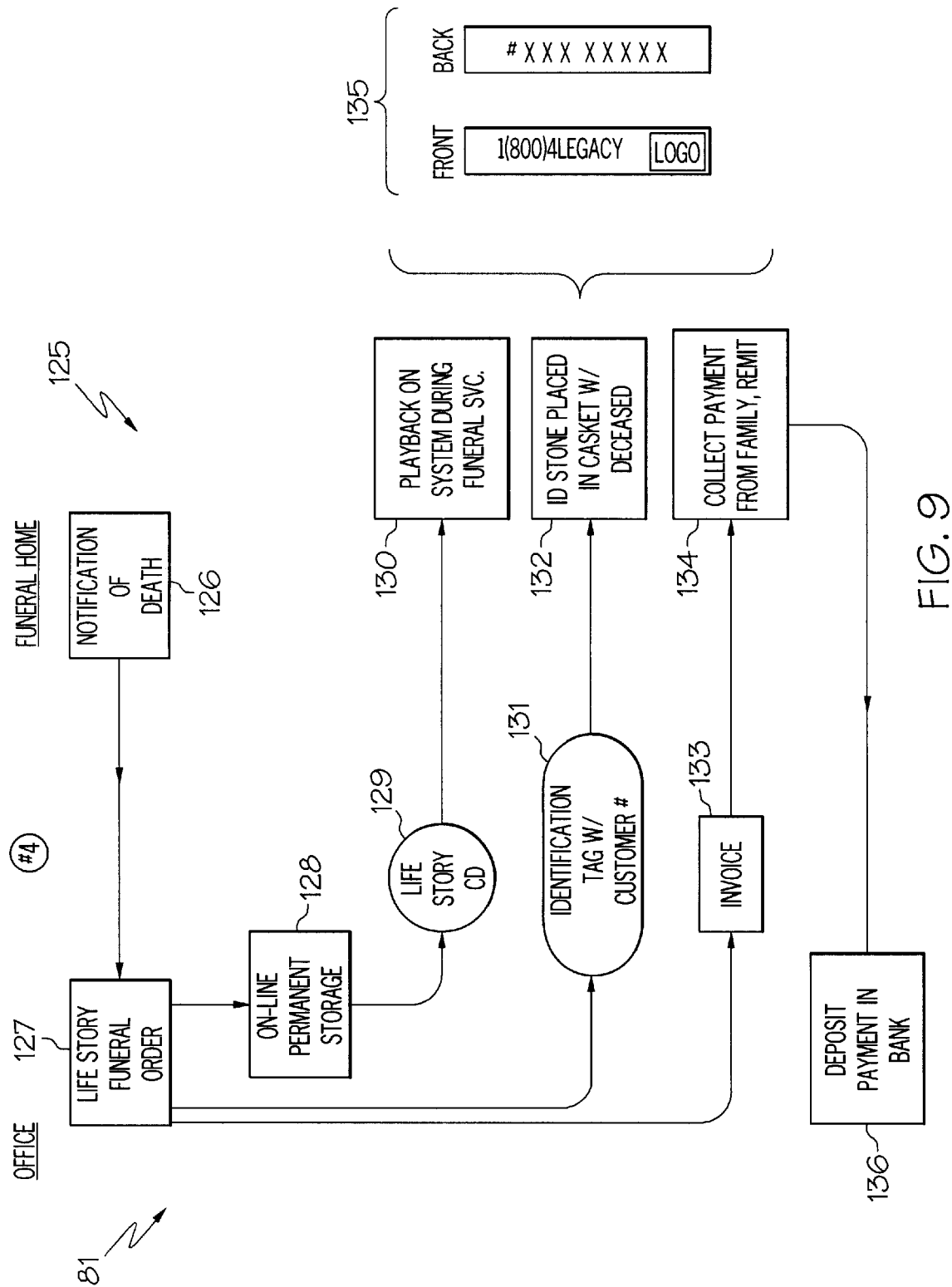
FIG. 9 illustrates a flowchart for accessing information about an entity by a funeral home.

Returning to FIG. 6, funeral homes can access the information in steps 102–103, which is detailed in the flowchart depicted in FIG. 9. Actions on the left 81 are performed by the central office, and actions on the right 125 are performed by the funeral home. Upon the notification of death 126, the Life Story funeral order is received by the office 127. In step 128, the on-line permanent storage of the individual's information is written to a computer-readable medium, such as a CD 129. The CD is delivered to the funeral home where the information can be played back on a computer system during the funeral service 130. At step 131, an identification tag with the customer number is also created, which is sent to the funeral home. In step 132, the identification tag is placed in the casket with the deceased. An example of the suitable identification tag is shown as 135, which will include the telephone number of the office and the customer identification number. Beyond an etched tag, a computer chip containing identification data could supplement or replace the tag 135. In step 133, the invoice is sent to the funeral home or any payments are collected and remitted to the office 134. At step 136 any payments are deposited.

The following describes examples of appropriate technology to implement the present invention for funeral homes, but is expected to be enhanced as technology improves. Funeral home systems can use fairly standard personal computers with a large computer screen. Several options available are:

(1) Use of Existing Designs—GATEWAY 2000 and several other computer manufacturers have developed big-screen systems. For example, GATEWAY'S DESTINATION system provides a 31" VGA screen manufactured by MITSUBISHI. The system also includes a keyboard and mouse/remote operated via radio frequency (RF). One potential problem with this system is that the MITSUBISHI monitor is a low resolution monitor which may be unsatisfactory.

Testing will be required to evaluate the MITSUBISHI monitor and others on the market.

(2) Custom-Designed System—Several approaches could be taken with a custom-designed system. The first is to use a local manufacturers system, but add a custom case. This local manufacturer could be provided with all software and exact design specifications necessary to produce them. The second is to produce them totally in-house. All parts can be purchased in quantities at reduced prices, thus ensuring they are built to specifications. This also has the advantage of retaining control of the software configuration process.

The way in which the computer system will be presented can vary greatly. Options include a kiosk-style design mounted on wheels, an A/V-style cart, or a wood cabinet with doors similar to ones used to hold TV's and stereos, etc.

It is expected that initially the funeral home would be provided with a CD continuing the deceased's Life Story, shipped via next day air. Later, as data transmission capabilities become more widely available and more cost effective, the CD would become unnecessary. A data connection could be made to download all Life Story data prior to the viewing at the funeral home. Later, as the technology improves even further, the data could be directly accessed in real time using an Internet or similar connection.

Figure 10:
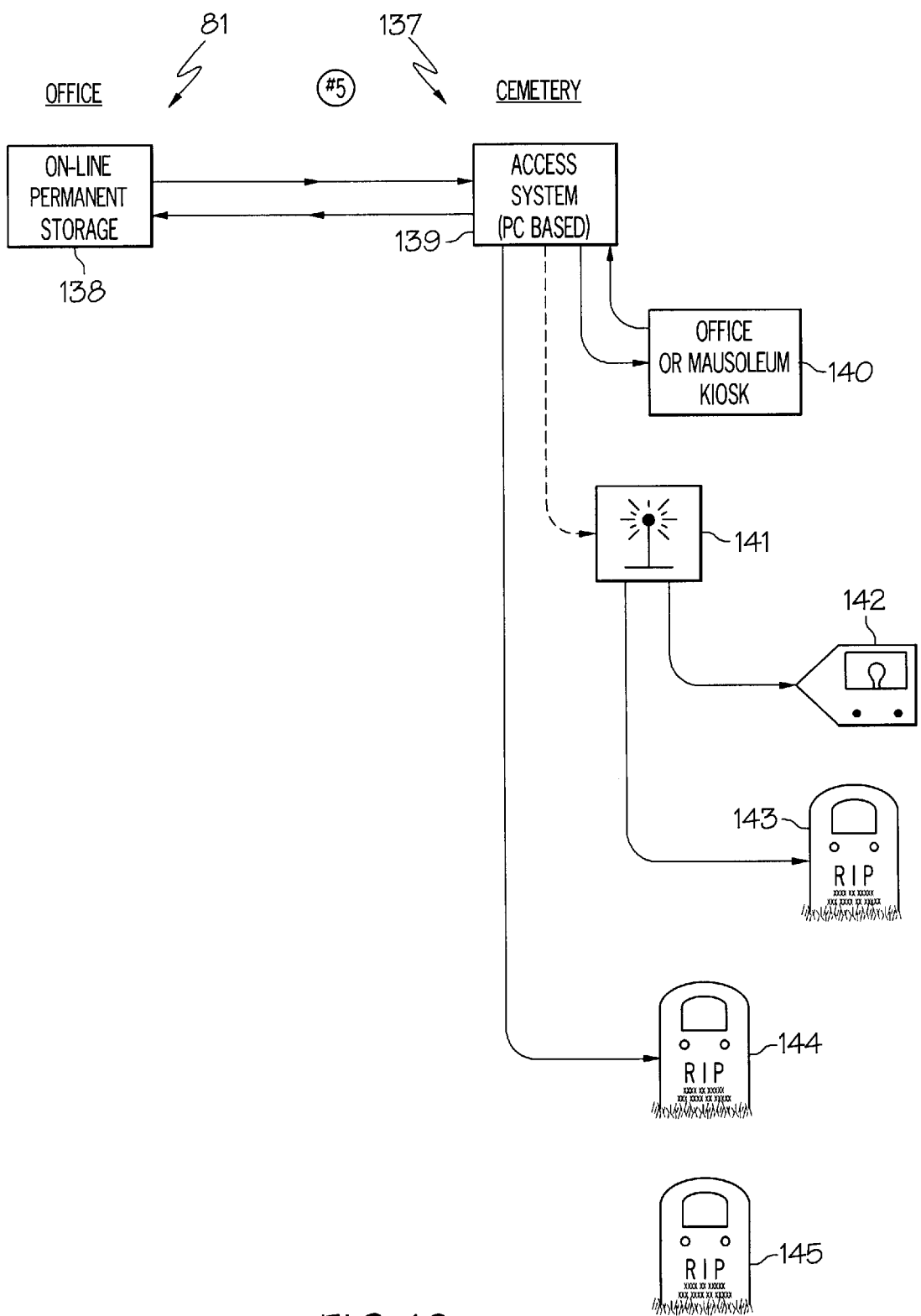
FIG. 10 illustrates a flowchart for accessing information about an entity by a cemetery.

Returning to FIG. 6, in steps 104–105 information is accessed by a cemetery. The details of such cemetery access is illustrated in the flowchart of FIG. 10. Actions on the left 81 are performed at a centralized office, and actions on the right 137 are performed at the cemetery. The information in the on-line permanent storage 138 is accessed through a PC based system 139 located at the cemetery. This connection can be periodic for updates from the central office to the cemetery or visa versa. Alternatively, the cemetery could have a CD juke box covering all of the cemetery inhabitants. In one embodiment, a kiosk located at the office or the mausoleum access the PC system 139 providing a multimedia presentation of the Life Story of a given individual. Preferably, the kiosk will have a touch screen technology to receive flexion inputs from the user.

In another embodiment, centralized cemetery will have a transmitter operating through radio frequencies, infrared, ultrasonic, or other suitable transmission forms. The transmitter will transmit information to either a hand-held receiver 142 so that users could view the information about an individual while standing at the burial site itself. Alternatively, the receiver can be built into the headstone itself, providing a similar interactive presentation of the information about the individual. In yet another embodiment, an interactive headstone 144 is connected directly to the PC based access system 143 via a cable, which is preferably located underground. Alternatively, the viewer can be built into a stand-alone headstone in which the information is stored locally with the headstone providing the same interactive presentation of the individual's life story.

Implementation of the present invention in cemeteries would preferably use a system migration path which allows Life Story data to be made available at a cemetery using a simpler delivery method with a migration path to full implementation.

(1) Kiosks—Kiosks could be designed with touch screens for ease of use. These kiosks would be connected via a network to a "server" which could contain a limited amount of commonly used information. The majority of information; however, would be accessed via switched network. This would allow the cemetery to have access to the latest information. Later information in this section assumes that during the early testing phases a server would not be installed, but instead that the cemetery system would be connected via a switched network to the primary computer system located at headquarters. Later when a server would be added, hardware costs would be higher, but communications costs could likely decrease and speed for some kiosk functions would increase.

There are several environmental concerns in having kiosks located outdoors, such as lighting and temperature. Issues include glare and intensity for computer screens in sunlight. This will also be an issue for the laptops mentioned later. While computer screens generally appear bright in normal indoor lighting conditions, they are very difficult to read under less than ideal lighting conditions. As a result, it will likely be important for these systems to be placed under big awnings or a similar type of cover so that outside lighting can be reduced. Special kiosks can be made which include automatically-controlled, built-in heating and air conditioning. These outdoor systems also have steel exteriors and for additional protection also include security sensors. Alternatively, the basic "Durashell" case could be used. The basic computer system is slightly more expensive than the standard system for use in indoor systems, but it is expected that the touch screens for outdoor use would be more costly.

Another potential issue for a kiosk system would be the data communication links back to headquarters. There are three factors involved: the data link at the remote site, the long-distance carrier charges, and the data link at the headquarters site. Currently, data rates for ISDN services vary greatly from city to city and even include a wide variety of pricing schemes. In addition to the issues above, there would also be various shipping and installation factors. The cemetery might need to build some type of enclosure to shade the system from direct sunlight.

(2) Multimedia Laptops—This possible solution would utilize standard multimedia-equipped laptops. Utilizing the same data links as with the kiosks, the appropriate data would be downloaded at the cemetery office. It would then be loaded onto the hard disk of the laptop. The system would not be portable, but data access would be restricted to the data on the laptop. Possible manufacturers include GATEWAY 2000 and IBM.

(3) Specialized Laptops or Palmtops—This type of laptop would be small in size, with the front face being primarily the screen and a limited number of keys. As no data transmission capabilities would be present, the machine would be loaded with the data as above.

(4) Specialized Laptop or Palmtops with Data Transmission Capabilities—Custom laptops, or palmtops, such as one developed by MOTOROLA have been developed, but have relatively slow data links which with the current technology would be insufficient for transmitting extensive multimedia information. As data transmission capabilities increase, however, these features will be added to realize the full system as it was originally envisioned.

It will likely be some time before data transmission capabilities evolve to the point which will allow smooth transfer at sufficient rates to accommodate multimedia. There are several reasons for this and they all involve limitations in broadcast capabilities due to the physics of waves. There are two possible ways that this could change: 1) Increases in compression technology so that more information can be carried at lower frequencies or 2) the possibility of being able to use very high frequencies for transmission. The difficulty with option 2 is that the FCC highly regulates the use of various bandwidths.

Figure 11:
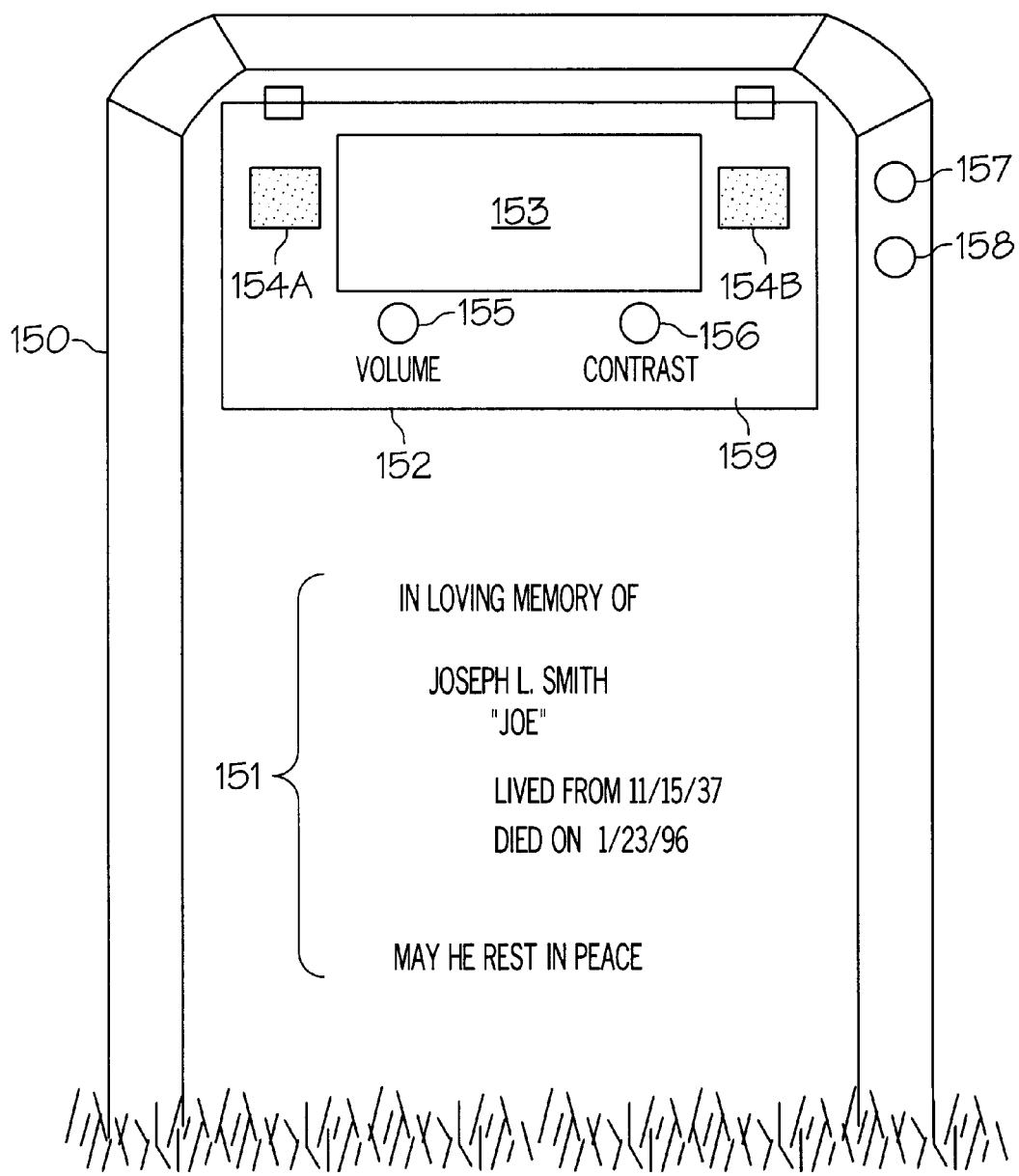
FIG. 11 illustrates a multimedia tombstone.

(5) Specialized "Interactive" Headstone—Recessed and protected within a stone case, a microchip with subject life story programed in, could play back information at the gravesite. One embodiment of an interactive headstone is illustrated in FIG. 11. The headstone 150 is a traditional stone gravemarker. The headstone 150 includes a traditional etched message 151. The headstone 150 also includes a recessed portion to receive the viewer 152, which is inserted within that recessed opening. An interactive touch screen 153 allows textual and visual message to be displayed to a user. A speaker 154A, 154B provide an audio presentation for the user, the volume of which can be controlled by the volume control 155. The contrast of the screen 153 can be controlled by the contrast control 156. The information relating to the buried individual can be stored in a sealed storage unit 157 or alternatively connected to a central database through a ground line or transmission system. The viewer unit 152 is powered by the seal power supply 158, or alternatively through a ground line. Preferably, the viewer unit 152 will turn on automatically upon the user touching the screen 153, and will shut off after a predetermined time with no activity. A clear protective cover 159 protects the viewer unit 52 from the weather and damage.

Figure 12:
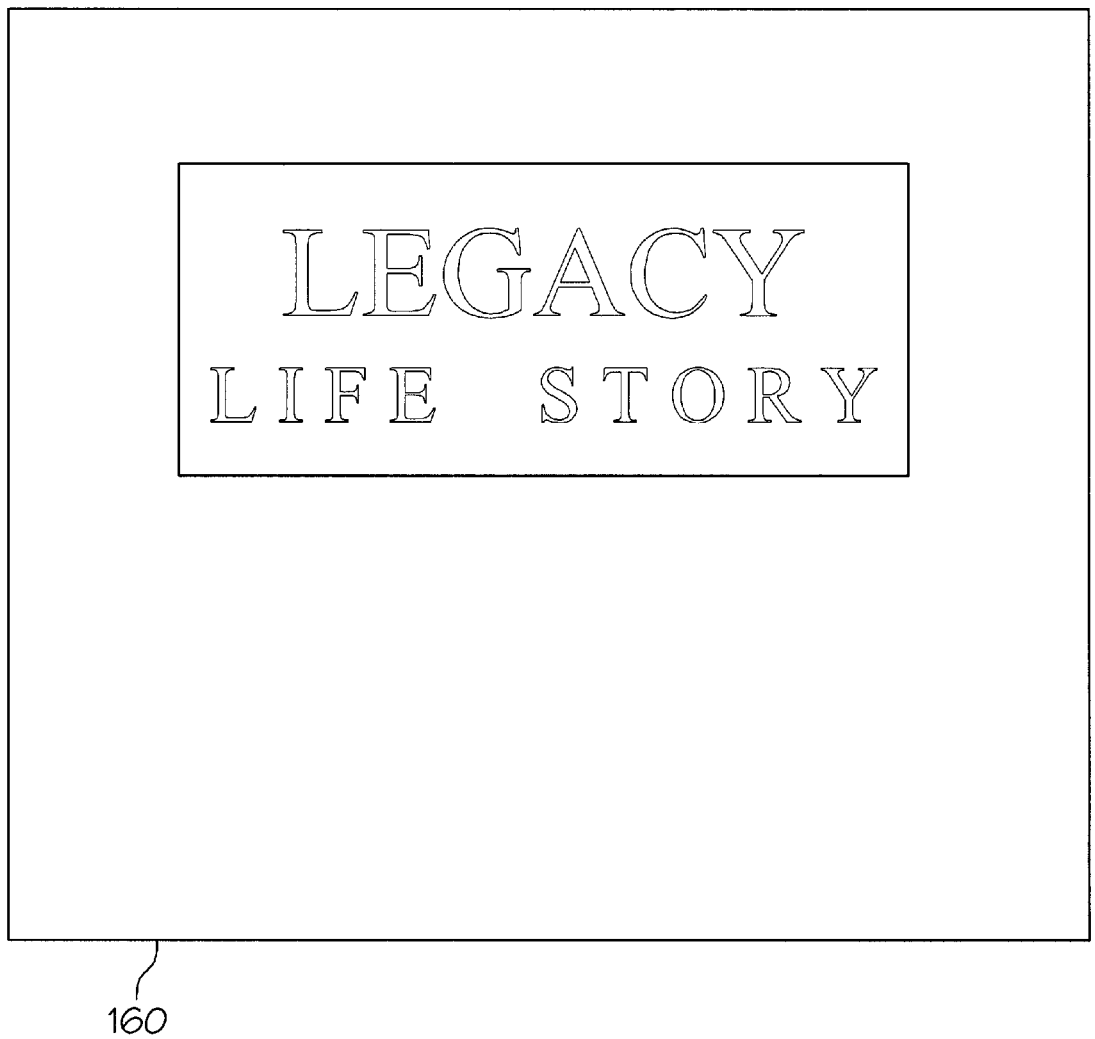
FIG. 12 depicts an opening screen.
Figure 13:
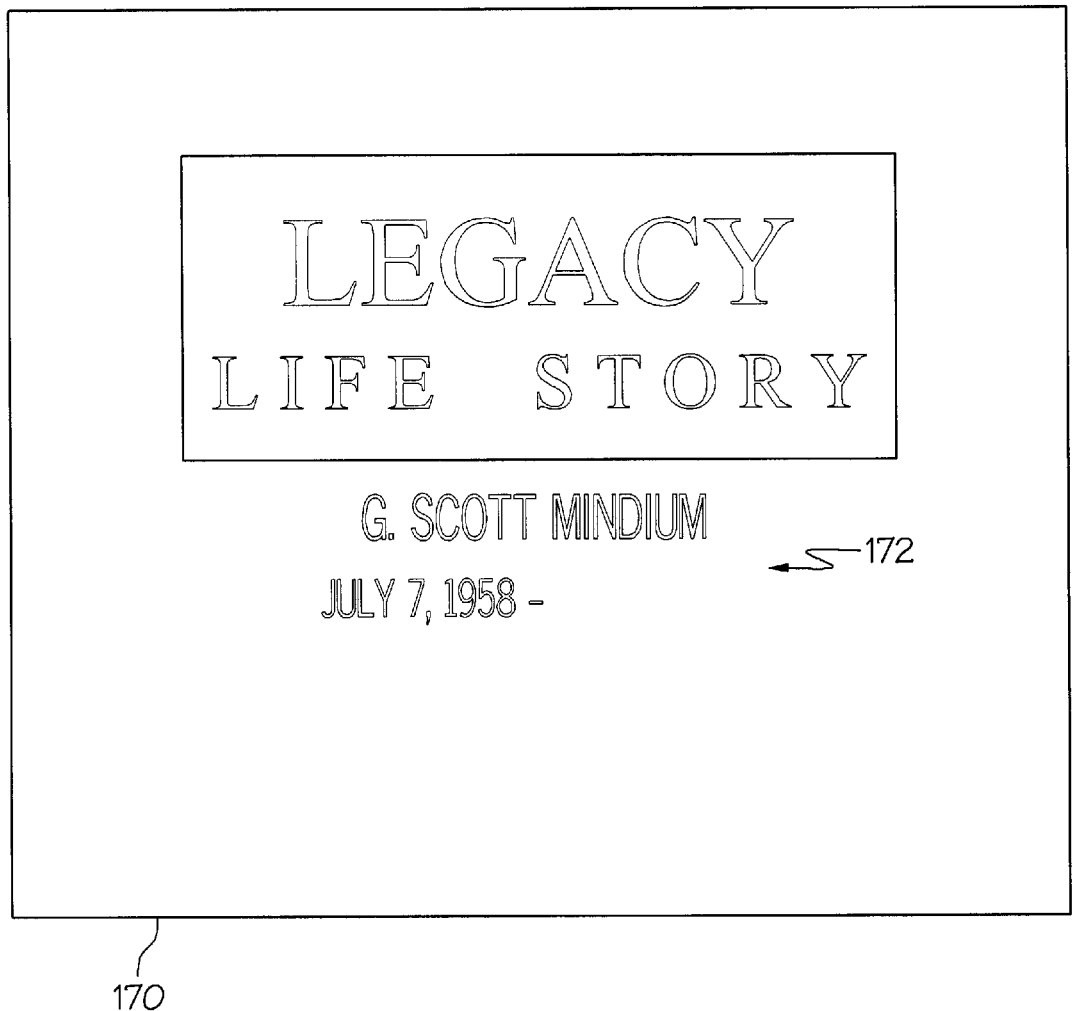
FIG. 13 depicts an introduction screen.

FIGS. 12–20 illustrate an embodiment of the present invention developed using MACROMEDIA DIRECTOR. Alternative embodiments can be developed developed using other development tools, such as hypertext mark-up language ("HTML") editors. FIG. 12 illustrates an opening screen 116 which is initially presented when the program is initiating. FIG. 13 illustrates an introductory screen 171 to an individual's Life Story. The introductory screen 170 includes a textual identification 172 of the individual and some other relevant information including, for example, the date of birth, date of death (if applicable), address, occupation, etc. The closing screen is identical to the introductory screen 170.

Figure 14:
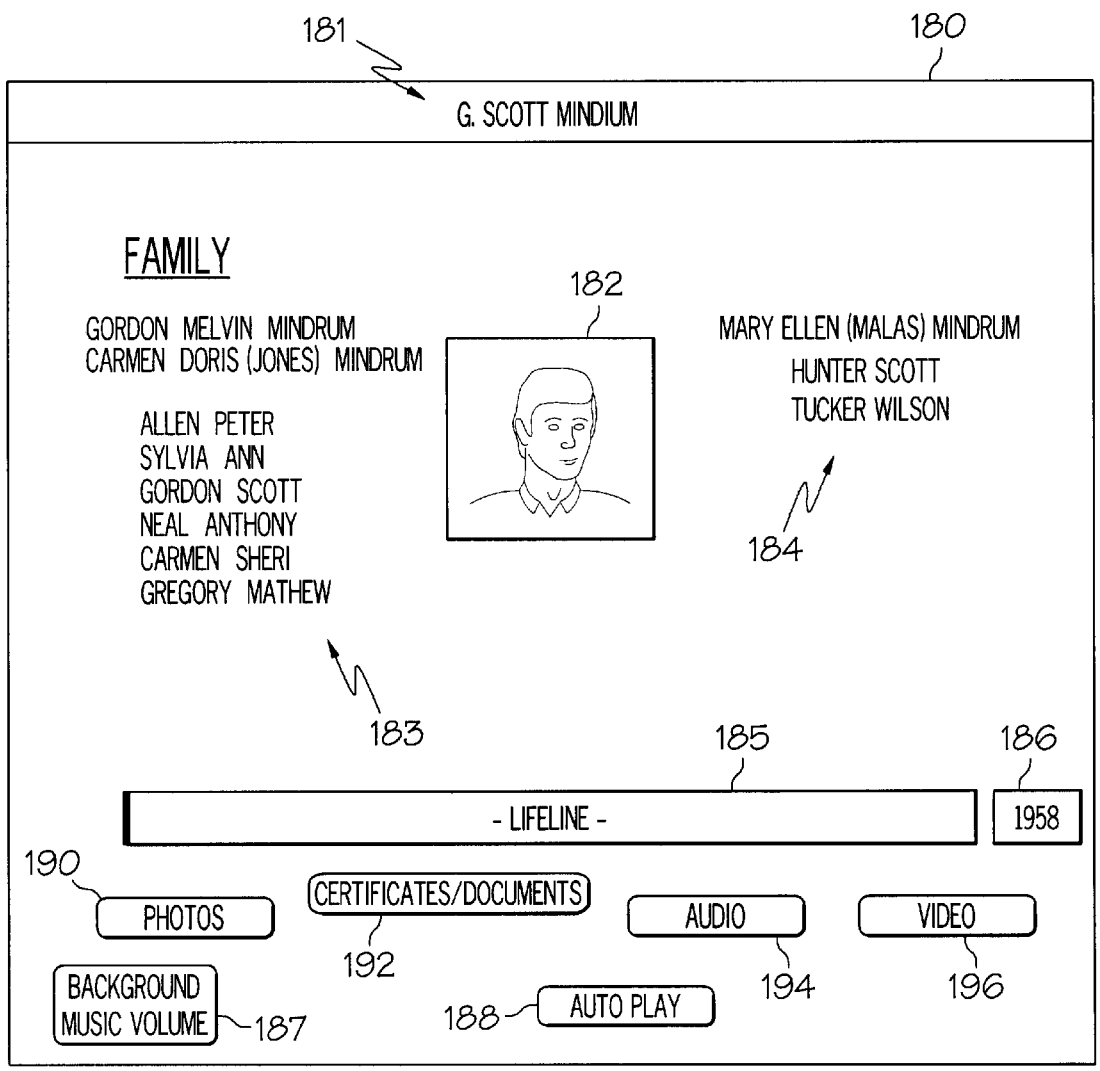
FIG. 14 depicts a main screen.

FIG. 14 illustrates an individual's main screen 180. The main screen 180 includes the textual identification of the individual 181 as well as a digitally rendered photograph of the individual 182. The list of relatives 183 displays a hierarchial representation of the individual's relatives with the individual's name listed accordingly to his/her respective relationship. Each listed relative includes a link to that relative's main screen. The list of relatives 183 are color-coded to indicate whether a main screen exists for that relative and whether that relative's main screen has been visited yet in this session. The immediate family of the individual is listed 184 to the right, which includes the spouse and the children. Like the relative list 184, the immediate family list 184 has links to their main screen and are color-coded.

The main screen 180 includes a slider life line bar 185 in which the user may interactively select a given period of time. The far left position indicates the date of birth of the individual. The selected period of time appears in the selection mechanism 186 accordingly. The selection mechanism 186 is linked to the screen 250 illustrated in FIG. 20. Using the life line 185 and selection mechanism 186, the user may view various recordations relating to the individual based on a selected period of time, irrespective of the recordation type. The user may also view recordations about the individual based on the type of recordation. For instance, the selection mechanisms 190, 192, 194 and 196 each link to screens 200, 210, 220 and 230, respectively. While the main screen 180 is being viewed, as well as the other screens, background music is played which can be controlled by the music selection mechanism 187. The auto play selection mechanism 188 will automatically display all recordations associated with the individual in chronological order.

Figure 15:
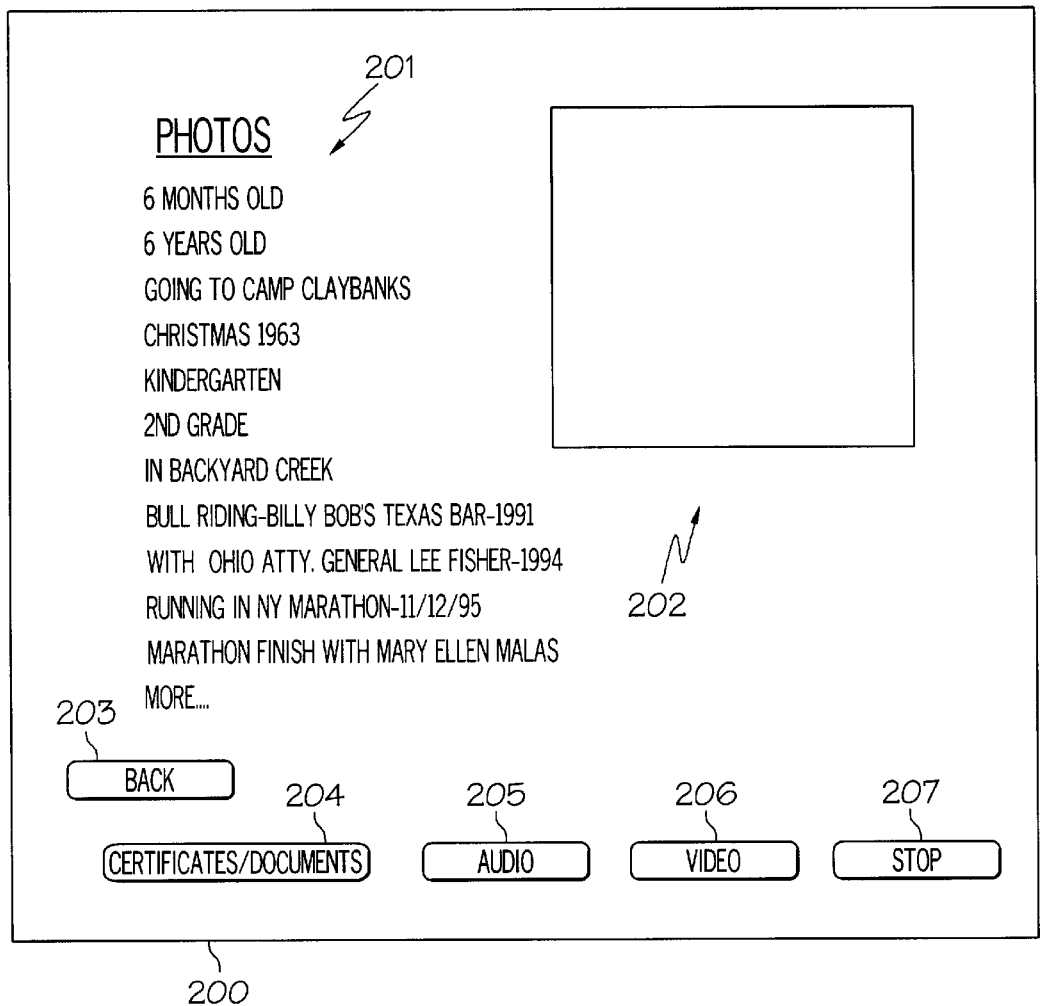
FIG. 15 depicts a photo screen.

FIG. 15 illustrates the photo screen 200. The photo screen 200 includes a list 201 of all photo recordations linked with the screen 200. Upon the selection of a listed item, the corresponding digitized photograph would be presented in the viewing area 202. Alternatively, the corresponding digitized photograph would be displayed on a separate screen, which would include a more detailed textual description of the photograph. The back selection mechanism 203 returns the user to the main screen 180. The selection mechanisms 204, 205 and 206 are linked with the screens 210, 220 and 230 respectively, thus allowing the user to navigate among the different types of recordations without returning to the main screen 180. The stop selection mechanism 207 returns the photo screen 200 to its ready state, as shown in FIG. 15, wherein no digitized photographs are displayed.

Figure 16:
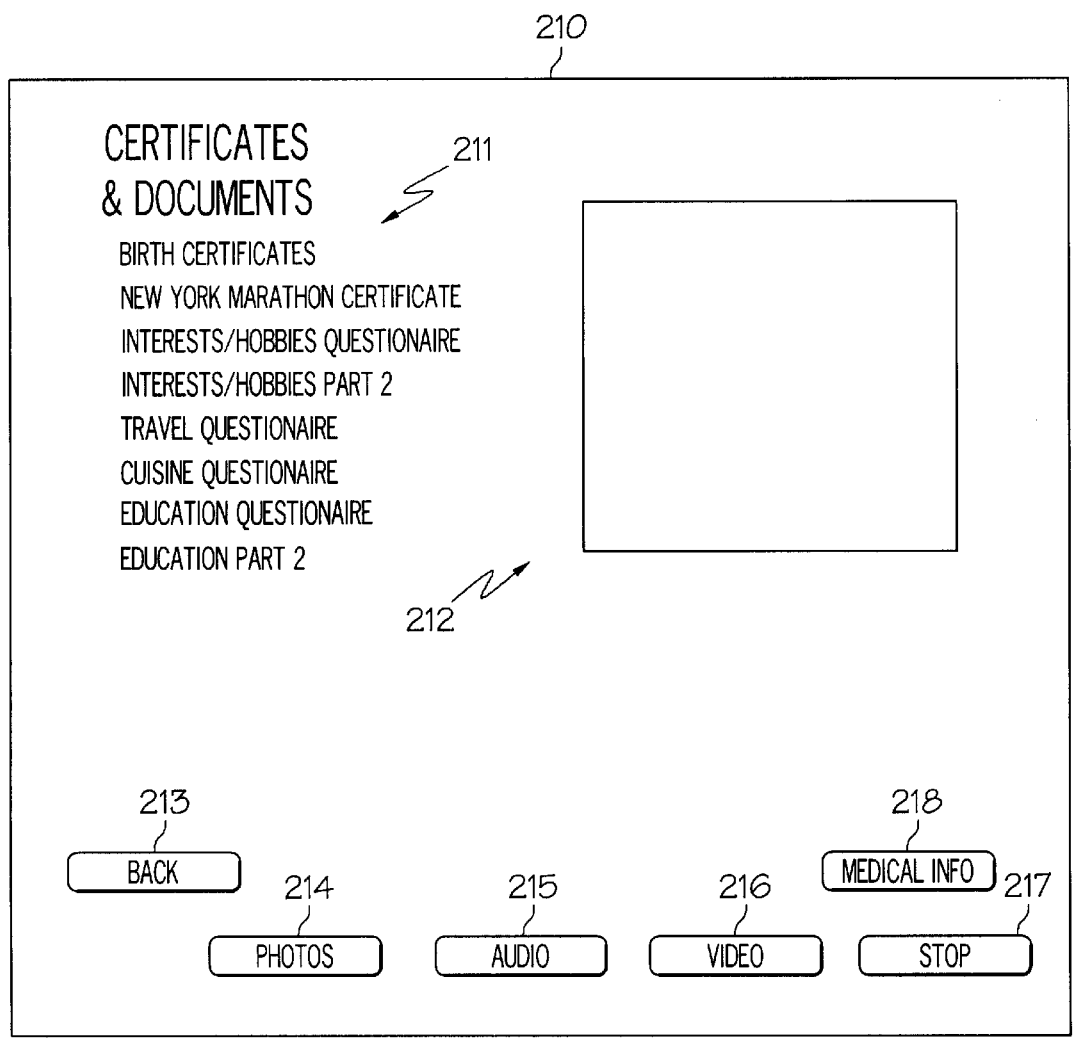
FIG. 16 depicts a documents/certificates screen.

FIG. 16 illustrates the certificates and documents screen 210. This screen 210 includes a list 211 of all associated certificates and document recordations. Upon the selection of a listed item, the digitized rendering of that recordation is displayed in the viewing area 212. Alternatively, the digitized representation appears in a separate screen accompanied by a detailed textual description. The back selection mechanism 213 returns the user to the main screen 180. The selection mechanisms 214, 215 and 216 are linked with screens 200, 220 and 230, respectively. The medical information selection option 218 is linked with the medical information screen 240. The stop selection mechanism 217 returns the certificates and document screen 210 to its ready state, as shown in FIG. 16.

Figure 17:
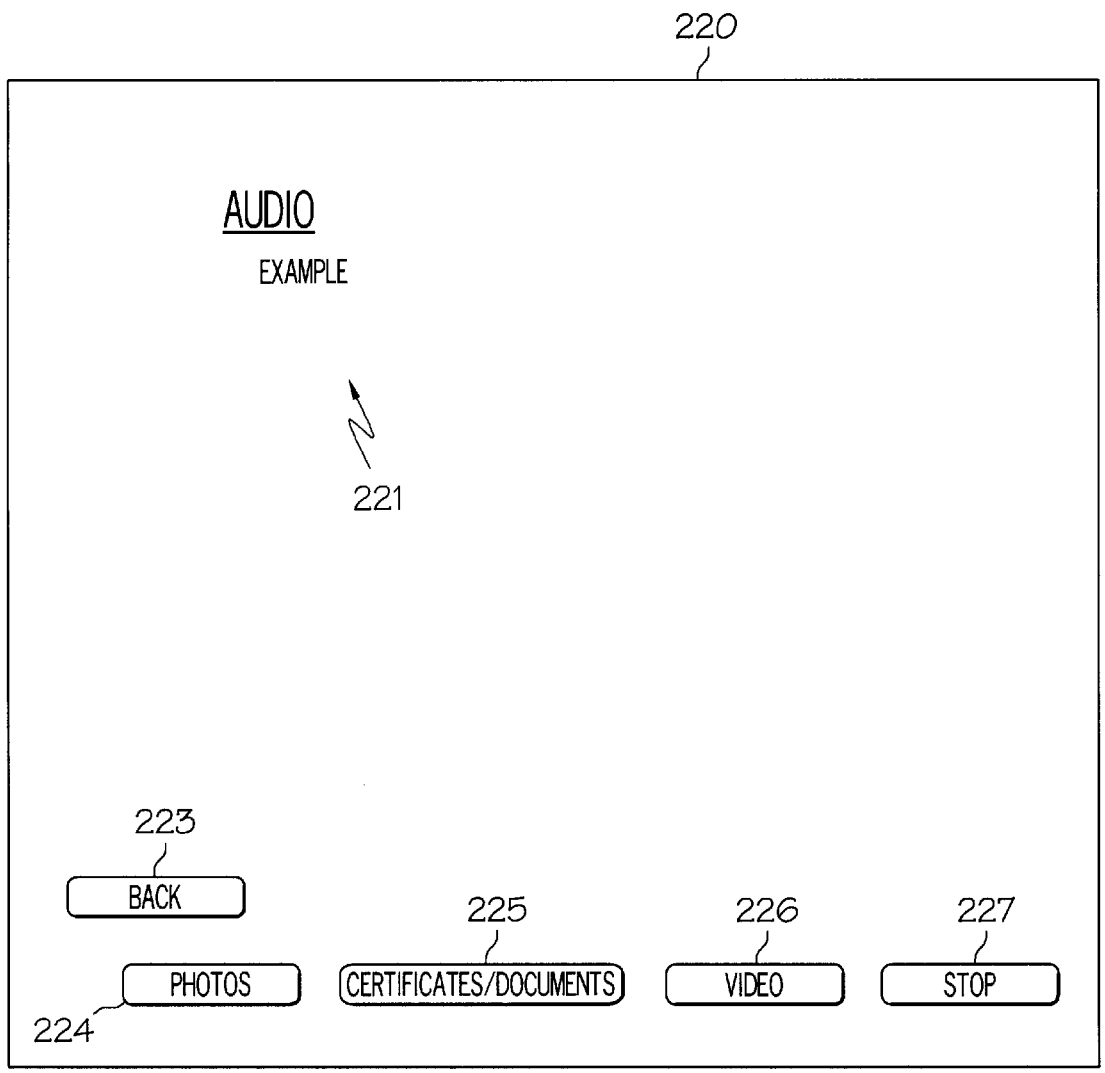
FIG. 17 depicts an audio screen.

FIG. 17 illustrates the audio screen 220. This screen 220 includes a list 221 of audio recordations. Upon selecting an audio sample, the corresponding audio recordation is presented to the user over a speaker system. The back selection mechanism 223 returns the user to the individual's main screen 180. The selection mechanisms 224, 225 and 226 are linked with screens 200, 210 and 230, respectively. The selection mechanism 227 stops the presentation of a given audio recordation.

Figure 18:
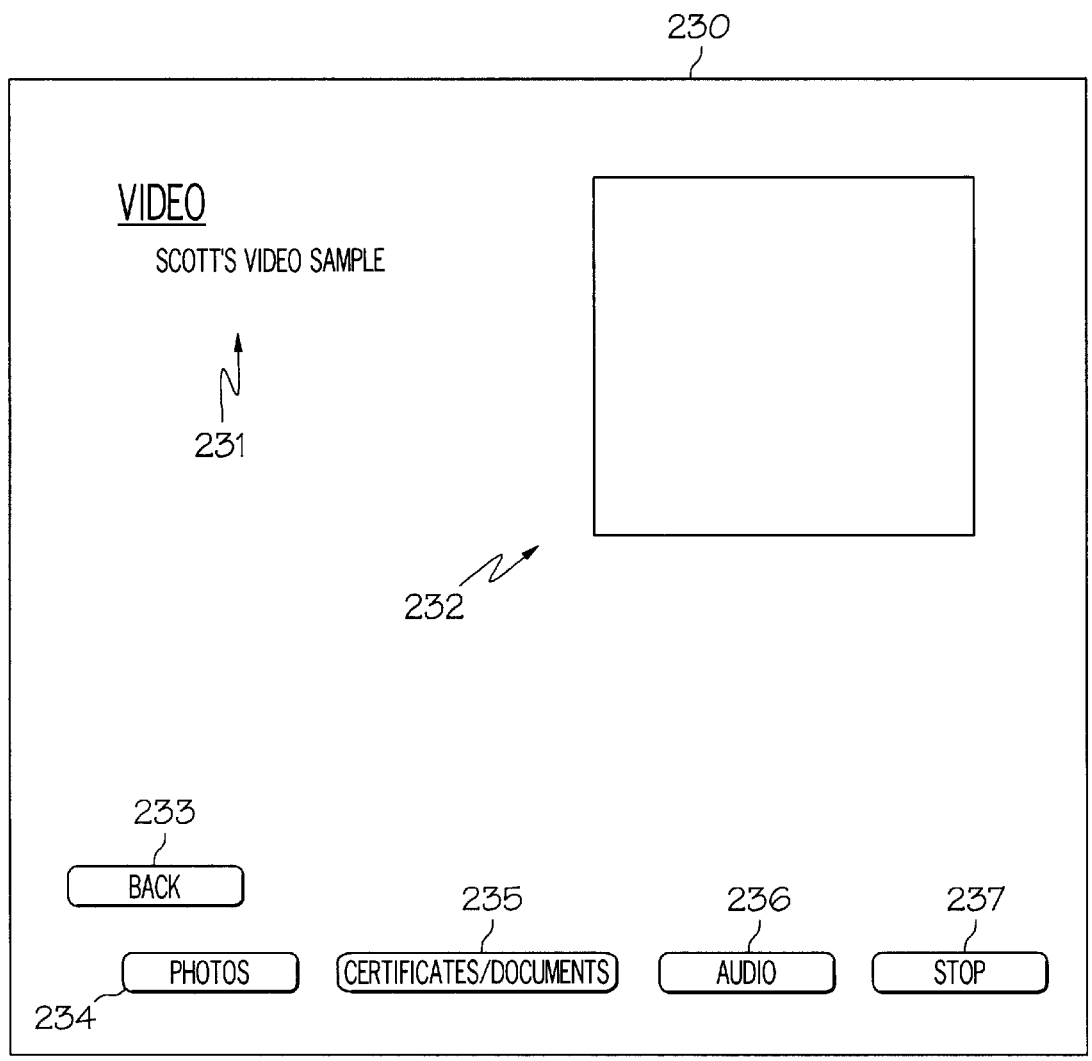
FIG. 18 depicts a video screen.

FIG. 18 illustrates the video screen 230. This screen 230 includes a list 231 of video recordations. Upon selection of a listed item, the corresponding video recordation is displayed in the area 232. Alternatively, the video recordation can be displayed on a separate screen having a detailed textual description of the recordation. The back selection item 233 returns the user to the main screen 180. The selection mechanisms 234, 235 and 236 are linked with screens 200, 210 and 220, respectively. The stop selection item 237 stops the presentation of the current video recordation.

Figure 19:
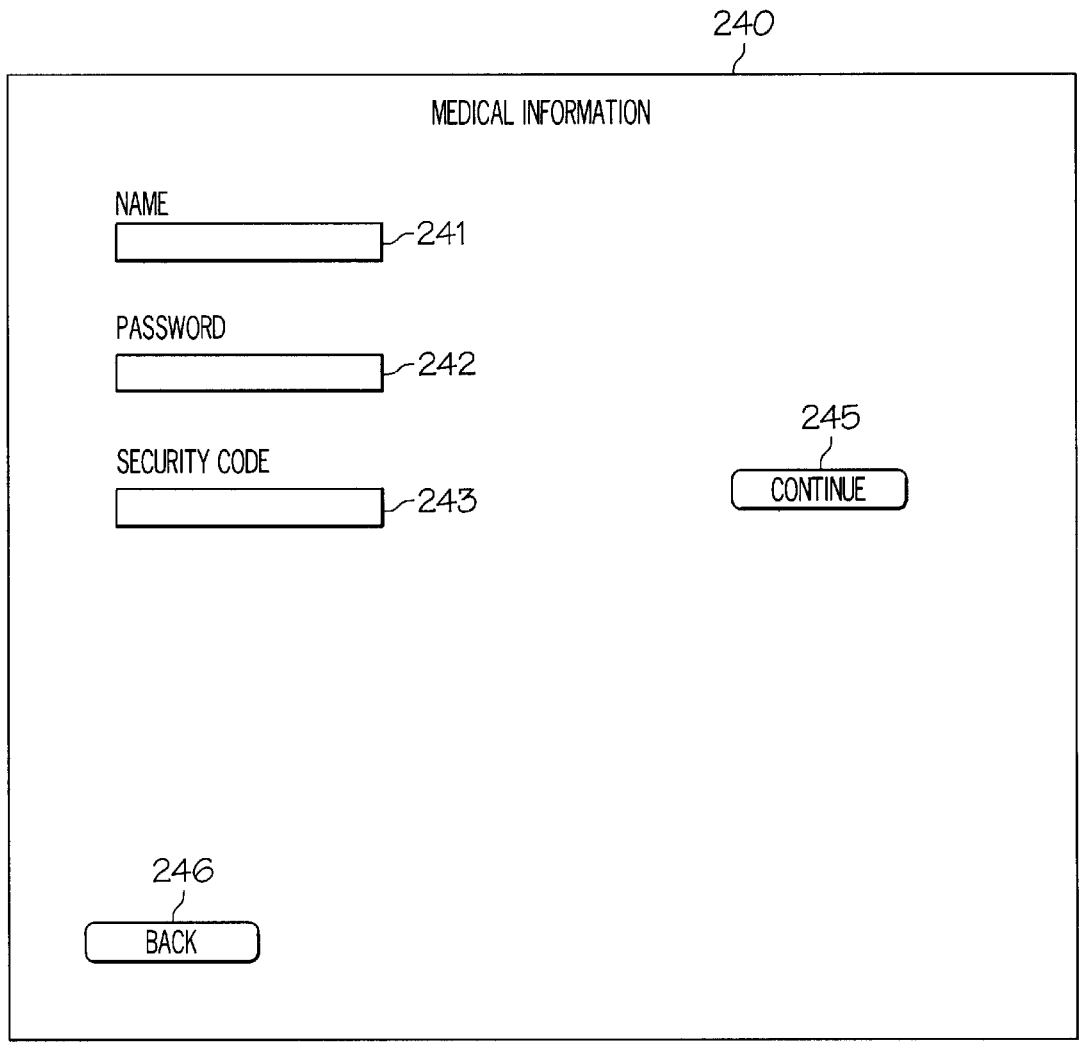
FIG. 19 depicts a medical screen.

FIG. 19 illustrates the medical information screen 240. Due to the sensitive nature of medical information, before corresponding medical recordations are presented to the user, the user must successfully complete information in the name field 241, password field 242 and security code field 243. If that individual has suitable rights, associated medical information, preferably in the form of digitized medical documents or textual information about the individual's medical history, is presented to the user. The continue button 245 allows the user to page through multiple medical recordations. The back selection item 246 returns the user to the certificates and documents screen 210.

Figure 20:
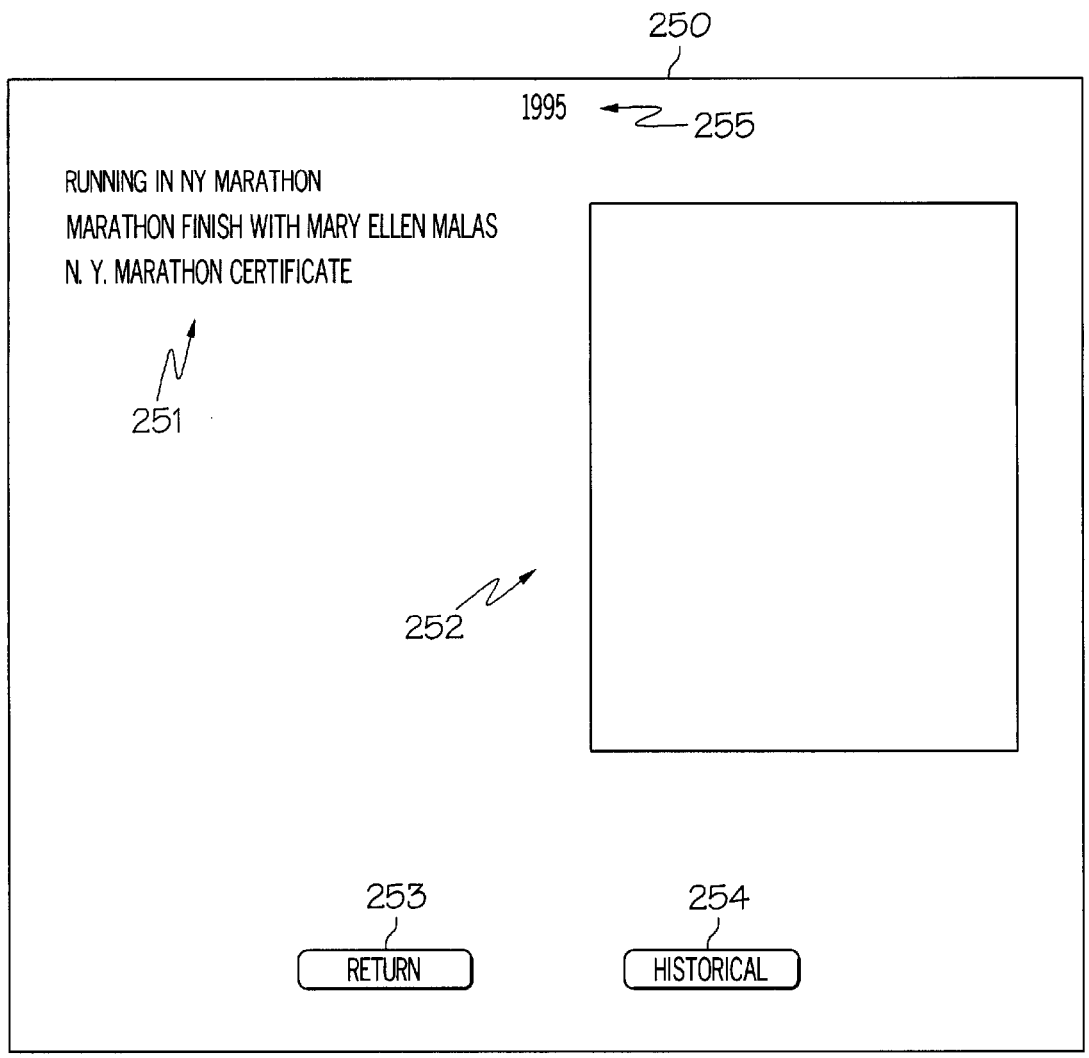
FIG. 20 depicts a history screen.

FIG. 20 illustrates the history screen 250. The history screen 250 is specific to a given year or period of time selected by the life line 185, which period of time is displayed at the top 255 of the screen 250. A list 251 of associated recordations are displayed for the selected period of time. Preferably, the listed recordations are type independent. Upon selecting a listed item, the corresponding recordation is displayed in the area 252 or alternatively on a separate screen. The return item 253 returns the user to the main screen 180. The historical selection item 254 presents historically significant events which were independent of the individual. Using this historical selection item 254, the user may compare an individuals time-based recordations against historical events of that time.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For instance, the present invention could be readily implemented for any entity, including businesses, buildings, pets, countries, parks, museum displays, or any other person or thing for which information is desired to be stored and displayed. Likewise, the invention is not limited to the death industry. For instance, the present invention could be used to maintain a running biography of event and achievements, documented in a variety of formats, for a living person or other entity. Accordingly, this invention is intended to embrace all alternatives, modifications, and variations that fall within the spirit and broad scope of the amended claims.

I claim:

1. An interactive user interface on a computer system for presenting information about an entity, the user interface comprising:
    a) a viewable screen image associated with the entity wherein the entity is at lease one of a person, an organization, and an animal;
    b) a plurality of life related recordations associated with the entity, the recordations being of at least two different types and being associated with a calendar date;
    c) a plurality of selection options on the viewable screen image, each of said selection options corresponding to at least one type of recordation such that when a selection option is selected the corresponding types of recordations are presented;
    d) a slidable calendar date selection option on the viewable screen image for selecting a date, said calendar date selection option being associated with at least a portion of the plurality of recordations such that when a specific date is selected the user interface presents one or more recordations which correspond to a selected calendar date;
    e) one or more future messages from the entity, the content of the future messages being provided from the entity and directed to the user of the interactive user interface;
    f) an access control mechanism preventing access to the future messages until a predetermined calendar date or event, wherein the event or calendar date is dictated by the entity; and
    g) a list of relatives to the entity, wherein one or more of the listed relatives has a link to a screen associated with that listed relative.

2. An interactive user interface as recited in claim 1, further comprising a historical selection option and data related to historical events independent of the entity, said history selection mechanism being operative to present at least a portion of the historical data which corresponds to a selected time period.

3. An interactive user interface as recited in claim 1, further comprising background music.

4. An interactive user interface as recited in claim 1, wherein the entity is a person.

5. An interactive user interface as recited in claim 1, further comprising a graphical representation of the entity displayed on the screen.

6. An interactive user interface as recited in claim 1, wherein the types of recordations include photographs, documents and videos.

7. An interactive user interface as recited in claim 1, wherein the time selection mechanism comprises a slider bar.

8. The interactive user interface of claim 1, wherein the plurality of selection options comprises a selection option for photographs.

9. The interactive user interface of claim 8, wherein the plurality of selection options further comprises a selection option for documents.

10. The interactive user interface of claim 9, wherein the plurality of selection options further comprises a selection option for videos.

11. The interactive user interface of claim 10, wherein the plurality of selection options further comprises a selection option for audio recordings.

12. The interactive user interface of claim 1, further comprising an auto play selection option on the viewable screen image, whereby when the auto play option is selected the recordations are presented in sequential order based upon their associated time periods.

13. A method for preserving and presenting information about a deceased person, the method comprising the steps of:
   a) entering into a contractual agreement with a physical customer;
   b) collecting from the customer a plurality of life related recordations relating to a person and one or more future messages provided from the person;
   c) categorizing the recordations in to different types;
   d) referencing the recordations with a calendar date;
   e) storing the categorized and referenced recordations and future messages on a computer readable medium;
   f) after the person is deceased, displaying on a computer system a plurality of options, wherein of the plurality of options correspondence exists between the options and the following:
      i) at least one type of recordation,
      (ii) a specific date, and
      (iii) at least one of the future messages;
   g) selecting by a user one or more of the options;
   h) presenting the recordations and future messages in accordance of a selected option by a user and preventing access to the future messages until a predetermined calendar date or event, dictated by the person or the customer; and,
   i) providing a list of relatives to the entity, wherein one or more of the listed relatives has a link to a screen associated with that listed relative.

14. The method of claim 13, wherein the customer is different from the person.

15. A graphical user interface for displaying information about a person, the user interface comprising:
   a) a plurality of life related recordations of different types relating to the person, each of said recordations being associated with a calendar date which is associated with the person;
   b) a plurality of viewable screens each associated with at least one of said recordations;
   c) a main viewable screen distinct from and linked to the plurality of viewable screens, the main viewable screen comprising:
      (i) a plurality of selectable type options each corresponding to at least one type of recordation, said type options being operative to display the viewable screens corresponding to the recordations of that type when the corresponding type option is selected;
      (ii) a selectable calendar date option for selecting a specific date, said specific date option being operative to display recordations associated with a selected date irrespective of the recordation type;
      (iii) a selectable future message option corresponding to one or more future messages from the person, the content of the future messages being provided from the person and directed to the user of the graphical user interface;
   d) an access control mechanism preventing access to future messages until a predetermined date or event, wherein the date or the event is dictated by the person; and
   e) a list of relatives to the entity, wherein one or more of the listed relatives has a link to a screen associated with that listed relative.

16. The graphical user interface of claim 15, wherein the different types of recordations comprises photographs, videos, and documents.

17. The graphical user interface of claim 15, wherein each of the plurality of viewable screens comprises a selectable list of recordations of the type corresponding to the screen display.

18. An interactive user interface on a computer system for presenting information about an entity, the user interface comprising:
   a) a viewable screen image associated with the entity wherein the entity is a human being;
   b) a plurality of life related recordations associated with the entity, the recordations being of at least two different types and being associated with a period of time;
   c) a plurality of selection options on the viewable screen image, each of said selection options corresponding to at least one type of recordation such that when a selection option is selected the corresponding types of recordations are presented;
   d) a slidable time selection option on the viewable screen image for selecting a period of time, said time selection option being associated with at least a portion of the plurality of recordations such that when a period of time is selected the user interface presents one or more recordations which correspond to a selected period of time;
   e) one or more future messages from the entity, the content of the future messages being provided from the entity and directed to the user of the interactive user interface;
   f) an access control mechanism preventing access to the future messages until a predetermined time period or event, wherein the event or period is dictated by the entity; and
   g) a list of relatives to the entity on the screen, wherein one or more of the listed relatives have a link to a screen associated with that listed relative.

* * * * *